United States Patent
Chang et al.

(10) Patent No.: US 10,887,815 B2
(45) Date of Patent: *Jan. 5, 2021

(54) HANDOVER MANAGEMENT BASED ON SPEEDS OF WIRELESS COMMUNICATION DEVICES

(71) Applicant: Kyocera Corporation, Kyoto (JP)

(72) Inventors: Henry Chang, San Diego, CA (US); Douglas Dunn, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 106 days.

This patent is subject to a terminal disclaimer.

(21) Appl. No.: 15/213,244

(22) Filed: Jul. 18, 2016

(65) Prior Publication Data
US 2016/0330671 A1    Nov. 10, 2016

Related U.S. Application Data

(63) Continuation of application No. 13/590,818, filed on Aug. 21, 2012, now Pat. No. 9,414,288.

(51) Int. Cl.
*H04W 36/36* (2009.01)
*H04W 36/32* (2009.01)
*H04W 36/00* (2009.01)

(52) U.S. Cl.
CPC ....... *H04W 36/32* (2013.01); *H04W 36/0083* (2013.01)

(58) Field of Classification Search
CPC . H04W 36/32; H04W 36/18; H04W 36/0083; H04W 36/08; H04W 36/00; H04W 8/08; H04W 76/27; H04W 76/04; H04W 36/04; H04W 88/02; H04W 36/24; H04W 36/0055; H04W 36/0061; H04W 36/0085; H04W 36/03; H04W 36/36
USPC ....... 455/437, 436, 439, 440, 441, 442, 443, 455/444
See application file for complete search history.

(56) References Cited

U.S. PATENT DOCUMENTS

| | | | |
|---|---|---|---|
| 7,082,304 B2 * | 7/2006 | Wakabayashi | H04W 36/18 370/331 |
| 7,536,186 B2 | 5/2009 | Dorenbosch et al. | |
| 8,761,770 B2 * | 6/2014 | Kazmi | H04W 52/386 455/436 |
| 8,812,050 B1 | 8/2014 | Bencheikh | |
| 9,426,700 B2 * | 8/2016 | Hahn | H04W 36/0009 |
| 9,813,964 B2 * | 11/2017 | Keskitalo | H04W 16/32 |
| 2004/0058678 A1 | 3/2004 | Detorbal | |
| 2005/0221828 A1 | 10/2005 | Wakuta et al. | |
| 2008/0043672 A1 | 2/2008 | Sebire et al. | |
| 2008/0225801 A1 * | 9/2008 | Turk | H04W 36/32 370/332 |
| 2009/0129341 A1 * | 5/2009 | Balasubramanian | H04W 36/0055 370/331 |

(Continued)

*Primary Examiner* — Khawar Iqbal

(57) ABSTRACT

A mobile wireless communication device notifies communication infrastructure that the mobile wireless communication device is traveling at a speed greater than a threshold speed. In response, the network infrastructure instructs the mobile wireless communication device to use a transition procedure to transition between base stations where the transition procedure is different from a handover procedure used by the mobile wireless communication device to change base stations when the speed of the mobile wireless communication device is less than or equal to the threshold speed.

9 Claims, 15 Drawing Sheets

(56) References Cited

U.S. PATENT DOCUMENTS

| | | | | |
|---|---|---|---|---|
| 2009/0247162 A1* | 10/2009 | Yasuoka | ............... | H04W 36/32 455/436 |
| 2010/0165065 A1 | 7/2010 | Nakajima et al. | | |
| 2010/0210301 A1 | 8/2010 | Dietz et al. | | |
| 2011/0136522 A1* | 6/2011 | Wu | ................... | H04W 36/0083 455/500 |
| 2012/0165065 A1* | 6/2012 | Sawada | ............ | H04W 36/0072 455/525 |
| 2012/0220302 A1 | 8/2012 | Ebara et al. | | |
| 2013/0095839 A1 | 4/2013 | Venkatraman et al. | | |
| 2013/0188503 A1* | 7/2013 | Anepu | .................. | H04W 36/08 370/252 |
| 2013/0225169 A1* | 8/2013 | Farnsworth | ........... | H04W 60/04 455/436 |
| 2013/0303081 A1* | 11/2013 | Chang | ............... | H04W 36/0061 455/11.1 |
| 2014/0029541 A1* | 1/2014 | Jung | ..................... | H04W 36/32 370/329 |
| 2014/0274070 A1* | 9/2014 | Lim | ...................... | H04W 48/08 455/444 |
| 2014/0295796 A1* | 10/2014 | Fox | ....................... | H04W 60/00 455/411 |
| 2015/0133079 A1* | 5/2015 | Smith | ................... | H04W 72/04 455/406 |
| 2015/0201395 A1* | 7/2015 | Jeong | ................... | H04W 64/00 455/456.1 |
| 2016/0345232 A1* | 11/2016 | Matsuo | ................... | H04W 4/08 |
| 2017/0164261 A1* | 6/2017 | Somasundaram | .... | H04W 48/20 |
| 2019/0342815 A1* | 11/2019 | Kim | ........................ | H04W 8/02 |

* cited by examiner

HANDOVER MANAGEMENT BASED ON SPEEDS OF WIRELESS COMMUNICATION DEVICES

RELATED APPLICATIONS

The present application is a continuation of U.S. application Ser. No. 13/590,818, entitled "HANDOVER MANAGEMENT BASED ON SPEEDS OF WIRELESS COMMUNICATION DEVICES", filed Aug. 21, 2012, hereby expressly incorporated by reference in its entirety, herein.

FIELD

This invention generally relates to wireless communications and more particularly managing handovers based on speeds of wireless communication devices.

BACKGROUND

Cellular and other wireless communication systems use base stations to provide wireless service to mobile wireless communication devices. Depending on the particular technology and preferences, a base station may be referred to as transceiver station, access node, access point, transceiver node, eNodeB, and eNB, as well as by other terms.

Base stations in cellular communication systems provide communications services to wireless communication devices within geographical cells where each base station exchanges signals with wireless communication devices within an associated cell. The size and shape of each cell is determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells, and femtocells.

When a mobile wireless communication device moves from one cell to another, conventional systems require the mobile wireless communication device to perform a handover procedure. As the speed of the mobile wireless communication device increases, the handovers occur more frequently and the efficiency of the communication system diminishes.

SUMMARY

A mobile wireless communication device notifies communication infrastructure that the mobile wireless communication device is traveling at a speed greater than a threshold speed. In response, the network infrastructure instructs the mobile wireless communication device to use a transition procedure to transition between base stations where the transition procedure is different from a handover procedure used by the mobile wireless communication device to change base stations when the speed of the mobile wireless communication device is less than or equal to the threshold speed.

DETAILED DESCRIPTION

Figure 1:
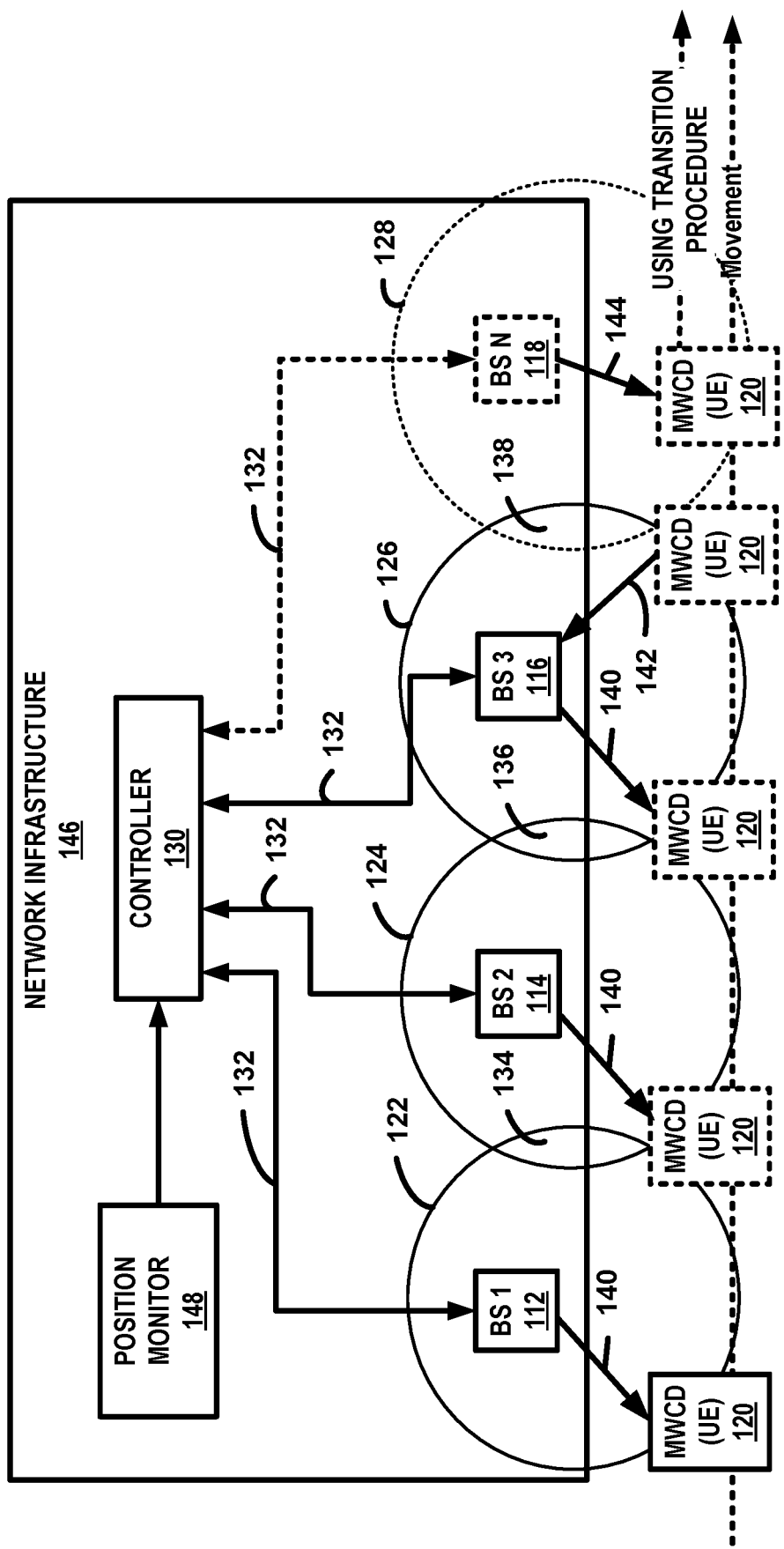
FIG. 1 is a block diagram of a communication system including a plurality of base stations providing wireless communication service to at least one mobile wireless communication device.

As described above, frequent handovers due to high speed of a mobile wireless communication device results in inefficient communication service, at a minimum. One example where the problem is evident occurs on high-speed trains. High-speed railway is growing tremendously. The high speed, however, presents a challenge to provide reliable communications for travelers. Presently, high-speed railways' communication falls far short of users' demand. In order to support reliable communications for travelers, the network deployment must resolve two types of challenges. First, at high speed, such as above 250 km/h, mobile wireless communication devices pass through multiple cells in a very short time. This causes excessive signaling load to the network and will often lead to dropped calls. Second, in current networks, it can take up to 6 seconds for a mobile wireless communication device to complete a handover between cells, while it usually takes much less than 6 seconds for high-speed trains at top speed to pass through the overlap region of two cells. As a result, mobile wireless communication devices cannot reliably complete handovers leading to dropped calls.

Conventional techniques for the handover procedure include the transmission of several messages to and from the mobile wireless communication device. The conventional handover messages provide information to the mobile wireless communication device and enable synchronization of the mobile wireless communication device to the target base station. The time required to execute and process these messages results in handover failures or radio link failures. For mobile wireless communication devices traveling on high-speed trains, these failures can be significant and greatly affects the quality of the user's experience. For the examples described herein, the handover delays are reduced by eliminating at least some of the messages for mobile wireless communication devices traveling at speeds above a threshold. The mobile wireless communication device notifies the network infrastructure when the mobile wireless communication device is traveling at high speed (i.e., at a speed greater than a threshold). The network instructs the mobile wireless communication device to use a transition procedure to transition between base stations instead of using a handover procedure for slower moving mobile wireless communication devices. Accordingly, slower moving mobile wireless communication devices can continue to perform handovers using conventional techniques while faster moving mobile wireless communication devices can use transition procedures that involve fewer delays when changing bases stations than conventional handovers. For the examples herein, the mobile wireless communication device refrains from transmitting signal measurements to the source base station during the transition procedures. In some transition procedures discussed below, the mobile wireless communication device monitors a group cell identifier (ID) that is common to base stations instead of a single cell ID that is unique to the base stations. If the group cell ID of the target base station matches the group cell ID of the source base station, the mobile wireless communication device switches to the target base station without sending measurement reports. In another transition procedure referred to herein as a transparent handover, the mobile wireless communication device compares the Physical Cell ID (PCI) to transparent PCIs previously provided by the network and switches to receiving communication service from the target base station without transmitting signal measurements to the source base stations.

FIG. 1 is a block diagram of a communication system 100 including a plurality of base stations 112, 114, 116, 118 providing wireless communication service to at least one mobile wireless communication device 120. Each base station can communicate with mobile wireless communication devices within a geographic service area 122, 124, 126, 128 of the corresponding base station. The geographic service areas 122, 124, 126, 128, often referred to as cells, may be any of numerous shapes and sizes and typically overlap with adjacent geographic service areas. The various functions and operations of the blocks described with reference to the communication system 100 may be implemented in any number of devices, circuits, or elements. Two or more of the functional blocks may be integrated in a single device and the functions described as performed in any single device may be implemented over several devices.

For example, at least portions of the functions of the controller may be performed by the base stations. A cellular communication system is typically required to adhere to a communication standard or specification. The Third-Generation Partnership Project Long-Term Evolution (3GPP LTE) communication specification is a specification for systems where base stations (eNodeBs) provide service to mobile wireless communication devices using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base stations 112, 114, 116, 118 are fixed transceiver stations, sometimes referred to as eNodeBs or eNBs, that may include controllers in some circumstances. For the examples herein, the network controller 130 includes the functionality of the Mobility Management Entity (MME) and the Packet Gateway (P-GW). The base stations are connected to a network controller 130 though a backhaul 132 which may include any combination of wired, optical, and/or wireless communication channels. In FIG. 1, N base stations are shown including a first base station 112, second base station 114, a third base station 116, and a fourth base station identified as the N base station 118. The N base station 118 is illustrated in dashed lines to indicate that the number of cell boundaries (N-1) used in the timing procedure may be different from the discussed example. Each base station has a geographic service area where adjacent service areas overlap in overlap regions 134, 136, 138. In a typical implementation, several base stations are positioned to provide continuous, or nearly continuous, coverage, within a large area. In implementations for high-speed trains, the base stations are arranged along the train tracks so that mobile wireless communication devices on the train are served by the base stations as the train traverses the geographic service areas.

The mobile wireless communication device 120 may be any kind of portable or mobile wireless transceiver device that can exchange wireless signals with the base stations 112, 114, 116, 118. Examples of wireless communication devices, sometimes referred to as User Equipment (UE), UE devices, handsets, mobiles, or portables, include devices such as cell phones, smart phones, transceiver cards, modem cards, and other similar devices.

For the example of FIG. 1, the mobile wireless communication device 120 is traveling at a relatively high speed and is depicted with dashed lines to illustrate the position at different points in time as the mobile wireless communication device 120 traverses the geographical service areas. The mobile wireless communication device determines whether it is traveling at a speed greater than a threshold speed by comparing the number of consecutive handovers between base stations within a time period to a threshold number of handovers in the time period. The actual numbers and evaluations may be done is any of several ways. The comparison can be between any information related to handovers observed during operation and threshold information. For the examples herein, the observed information includes a total number of handovers completed in a time period.

The threshold information may be static, semi-static, or dynamic. In the examples described herein, the threshold information is provided by each base station anticipated to service mobile wireless communications device traveling above the threshold speed. For example, a threshold information message 140 is transmitted by each of the base stations along a path of a high-speed train. The threshold information message may include any information, data, or parameter that allows the mobile wireless communication device to determine if the device has a speed greater than a threshold. An example of suitable threshold information includes a threshold number of handovers and a threshold time period.

As described below in further detail, the mobile wireless communication device starts a timer at a prescribed time after receiving the threshold information. In the example, the timer is started immediately after handover is completed. The timer may be started at other times in some circumstances. For example, the timer can be started immediately after receiving the threshold information or may be started when a new PCI is detected. The timer continues to elapse until it reaches the threshold time period, the threshold number of handovers is detected, or new threshold information is received. If the threshold time period is reached, the timer is restarted upon the completion of the subsequent handover and counting of the number of handovers is restarted. If new threshold information is received, the timer is restarted and counting of the number of handovers is restarted and the evaluation of the handovers is continued in accordance with the new thresholds.

In response to determining that the number of counted handovers has reached the threshold number of handovers before the time period has expired, the mobile wireless communication device determines that it is traveling at speed greater than the threshold speed. The mobile wireless communication device 120 notifies the network infrastructure 130 that the mobile wireless communication device 120 has a speed greater than the threshold speed. Although various techniques may be used to notify the network, a message 142 is transmitted from the mobile wireless communication device to the currently serving base station 116. In the example of FIG. 1, the mobile wireless communication device 120 sends the speed threshold indicator message 142 to the third base station (N-1 base station) 116 when a handover decision is made to perform a handover to the fourth base station (N base station) 118. The mobile wireless communication device, however, may notify the network at other times and through other base stations. For example, the speed threshold indicator message 142 may be transmitted to the fourth base station (N base station) after the handover is completed.

In response to the speed threshold indicator message 142, the network 146 instructs the mobile wireless communication device 120 to use a transition procedure to allow the mobile wireless communication device to perform transitions between base stations rather than engaging in a handover procedure when changing base stations. The controller 130 in the network infrastructure 146 receives the speed threshold indicator and determines whether the mobile wireless communication device should use a transition procedure instead of the handover procedure. The determination may be based only on receiving the indicator or may be based on other factors such as mobile wireless communication device capabilities and network verification of speed. Regarding capabilities, the network infrastructure 146 may base the transition procedure decision on whether the particular mobile wireless communication device is capable of supporting the transitional procedures without using the conventional handover procedure. This may be based on the Capability Information sent by the mobile wireless communication device after the mobile wireless communication device transitions from IDLE mode to CONNECTED mode.

The speed determination procedure performed at the mobile wireless communication device in many circumstances will not provide a highly accurate estimate of speed. In the example, the network infrastructure verifies that the speed of the mobile wireless communication device is sufficiently high to justify using the transition procedure instead of the conventional handover procedure. The verification may be accomplished using the position information received from the position monitor.

A transition procedure instruction message 144 is transmitted by the network infrastructure 146 to the mobile wireless communication device 120. The message is transmitted after the network determines tracking information for tracking the location of the mobile wireless communication device when it begins using the transition procedure. For implementations for high-speed trains, for example, the network 146 determines the train on which the mobile wireless communication device 120 is traveling. After the train is identified, the network infrastructure 146 transmits the transition procedure instruction message instructing the mobile wireless communication device to use the transition procedure. For the example of FIG. 1, the transition procedure instruction message 144 is transmitted by the fourth base station (N base station) 118. In some situations, the message is sent by a base station farther down the track. This may occur, for example, when the train has not been identified before the next handover is completed. For the examples herein, the transition procedure instruction message is transmitted using a dedicated RRC signaling message. Other techniques may be used to send the transition procedure instruction message, however. A position monitor 148 provides information regarding the train that allows the controller 130 to track the position of the mobile wireless communication device 120. Although other types of position monitors may be used, suitable examples of position monitors are based on high-speed train tracking infrastructure as discussed below in further detail.

After the transition procedure instruction message is received by the mobile wireless communication device, the mobile wireless communication device uses a transition procedure to change base stations instead of using a handover procedure. As discussed herein, a handover procedure is a conventional handover procedure that includes all over-the-air messaging with the mobile wireless communication device that is specified by the communication specification (e.g., LTE) and a transition procedure is any procedure that omits any of the required over-the-air messaging with the wireless communication device. For the examples herein, the mobile wireless communication device refrains from transmitting signal measurements to the source base station during the transition procedures. Examples of suitable transition procedures include the transparent handover procedure and the group cell ID monitoring transition procedure. The two examples of transition procedures are discussed immediately below and in further detail with reference to FIG. 7A-FIG. 16. During the group cell ID monitoring transition procedure, the mobile wireless communication device monitors a group cell ID that is common to base stations instead of a single cell ID that is unique to the base stations. During the transparent handover procedure, the mobile wireless communication device compares a newly detected PCI of the target base station to transparent PCIs identified by the network and switches to receiving communication service from the target base station without transmitting signal measurements to the source base stations During the group cell ID transition procedure, the mobile wireless communication device is instructed to monitor a control channel used by base stations along the path of the mobile wireless communication device to transmit control messages that include a group cell ID of the transmitting base station. For the examples, each base station along the device path transmits two cell IDs where one of the cell IDs is a unique value corresponding to the base station or sector and a second cell ID is the value used by the mobile device during the restricted handover state. The unique cell ID corresponding to the individual base stations is a conventional Cell Identity (Cell ID) and referred to herein as a single cell ID. The cell ID used by devices during the Group Cell ID transition state is referred to herein as a group cell ID. When using the group cell ID, the mobile device invokes a handover procedure only when a new group cell ID is received. In other words, the mobile device compares a stored group cell ID received from a base station to the group cell ID received from the next base station along the path. If the value of the group cell ID received from the next base station is different from the previously received stored value, the mobile device invokes a handover procedure by reporting a signal measurement report to the network. Otherwise, the mobile device continues to monitor the group cell ID and uses the appropriate PCI to communicate with the next base station. The mobile device, therefore, continues to use the group cell ID to determine whether to invoke a handover operation for the next base station along the path. In conventional handover procedures, the mobile wireless communication device initiates the handover procedure by sending a measurement report to the source base station. The source base station communicates with the next (target) base station to coordinate the handover. The source base station instructs the mobile device to perform the handover, if the handover is granted. For the examples herein, however, the mobile wireless communication device will refrain from sending a measurement report to the source base station when the group cell ID received from the next base station is the same as the stored group cell ID. The mobile device, therefore, does not receive a handover instruction from the source base station even though it will transition to the next base station. The exchange of handover information (context transfer) between the source base station and the target base station remains intact as compared to conventional systems and only the handover procedures involving the over-the-air signaling exchange between the mobile device and the source base station is omitted. The exchange of the handover information between the source base station and the target base station is triggered by the tracked position of the mobile device and not by a measurement report. The group cell ID monitoring transition procedure and the transparent handover procedure are discussed in further detail below.

Figure 2:
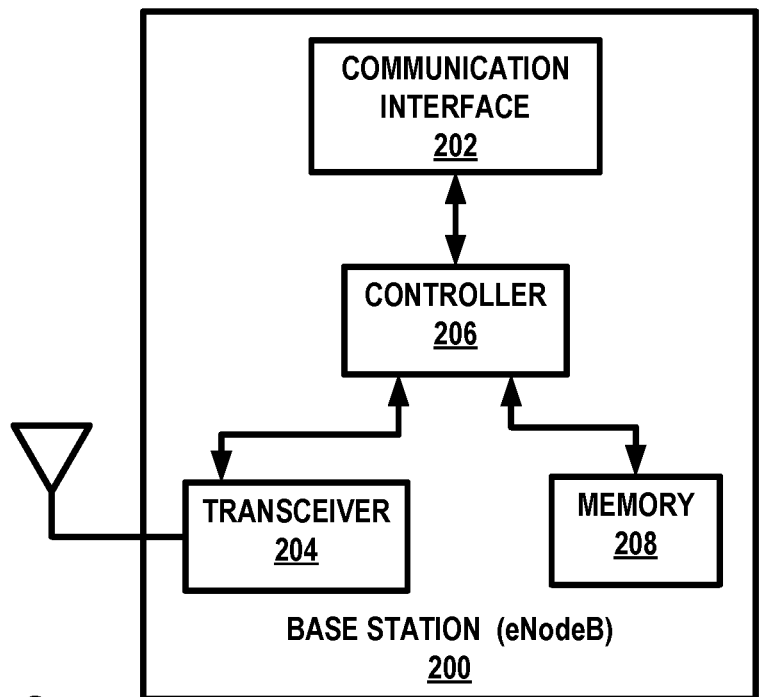
FIG. 2 is a block diagram of a base station (eNodeB) suitable for use as of the base stations.

FIG. 2 is a block diagram of a base station (eNodeB) 200 suitable for use as the base stations 112, 114, 116, 118. The base station 200 includes at least electronics and code for forming at least a communication interface 202, a transceiver 204, a controller 206, and a memory 208. The base station 200 may include other components as understood in the art. Portions of the components may be shared between the functional blocks. The controller 206, for example, may perform some transceiver 204 functions in some circumstances.

For the examples, each communication interface 202 communicates with the network controller 130 and other base stations. The communication links between the network controller and the communication interface are in accordance with S1 signaling protocols and techniques while the communication links between base stations are in accordance with X2 signaling protocols and techniques. Accordingly, the network controller 130 is connected to the base stations through S1 communication links and the base stations are connected to each other through an X2 communication link. Other communication links can be used in some circumstances.

The transceiver 204 transmits downlink wireless signals to mobile wireless communication devices and receives uplink wireless signals from mobile wireless communication devices. The controller 206 controls components of the base station to manage the functions of the base station and facilitate the functions described herein as well as the overall functionality of the base station 200. The controller is connected to a memory 208 which can be any suitable memory storage device capable of storing code and data.

Figure 3:
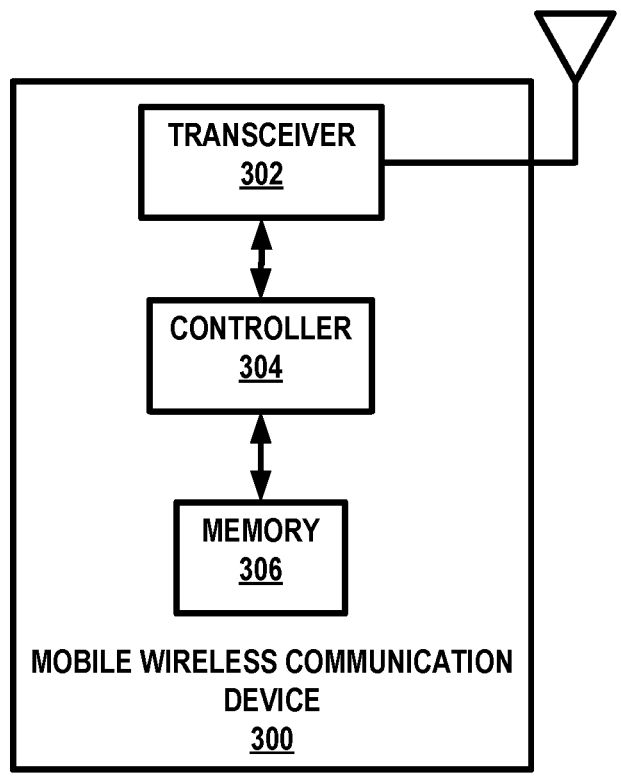
FIG. 3 is a block diagram of a mobile wireless communication device suitable for use as any of the mobile wireless communication devices discussed herein.

FIG. 3 is a block diagram of a mobile wireless communication device 300 suitable for use as any of the mobile wireless communication devices discussed herein. The mobile wireless communication device 300 includes at least electronics and code for forming at least a transceiver 302, a controller 304, and a memory 306. The mobile wireless communication device 300 may include other components as understood in the art. Portions of the components may be shared between the functional blocks. The controller 304, for example, may perform some transceiver 302 functions in some circumstances.

The transceiver 302 transmits uplink wireless signals to base stations and receives downlink wireless signals from base stations. The controller 304 controls components of the mobile wireless communication device 300 to manage the functions of the mobile wireless communication device 300 and facilitate the functions described herein as well as the overall functionality of the mobile wireless communication device 300. The controller 304 is connected to a memory 306 which can be any suitable memory storage device capable of storing code and data.

Figure 4:
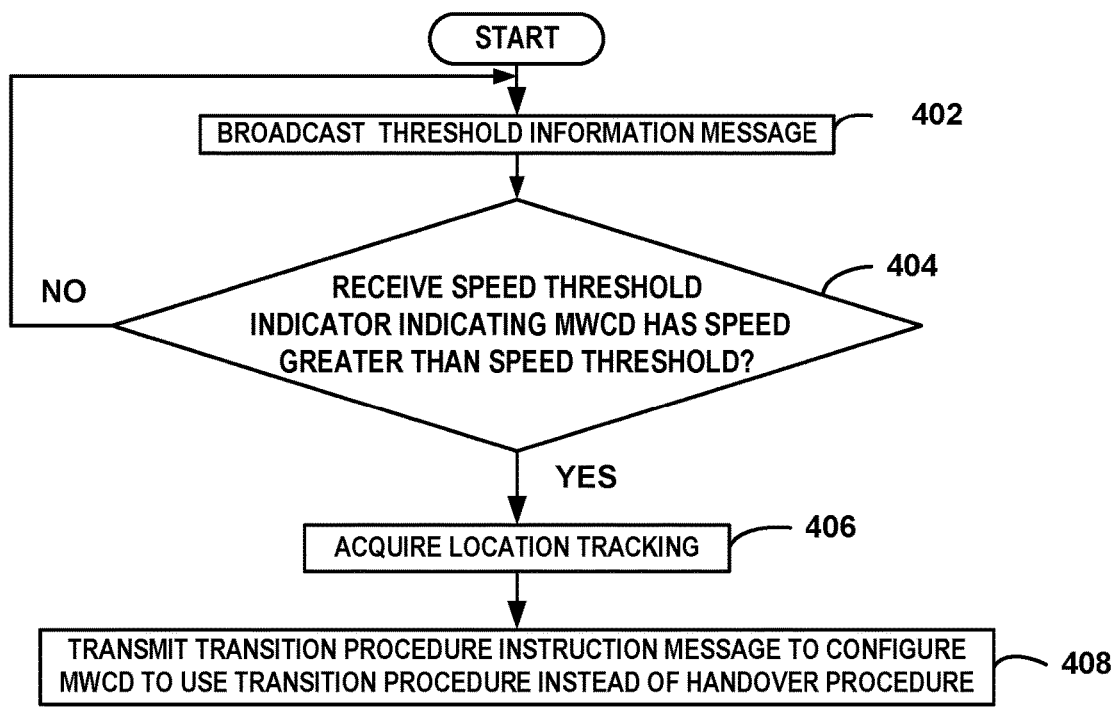
FIG. 4 is a flowchart of a method of managing handovers based on the speed of a mobile wireless communication device.

FIG. 4 is a flowchart of a method of managing handovers based on the speed of a mobile wireless communication device 120. The example discussed with reference to FIG. 4 is performed by the network infrastructure 146. Accordingly, the controller 130 performs valuations and issues instructions by sending messages through the base stations. The steps and functions, however, may be performed by any combination of code, devices, and electronics. Some of the controller functions, for example, may be performed by base station controllers at the base stations.

At step 402, the threshold information is broadcasted. Each base station that can support a transition procedure in addition to handover broadcasts a threshold information message that indicates values that are to be used by a mobile wireless communication device to determine if the device is traveling above a speed threshold. For the example, the threshold information message indicates a minimum number of handovers for a time period. Although other types of messages and channels can be used, an example of a suitable technique for broadcasting the threshold information includes sending the message in a System Information Block over the Downlink Shared Channel (DL-SCH).

At step 404, it is determined whether a speed threshold indicator has been received from a mobile wireless communication device. For the examples, the indicator is sent in an uplink signaling message, such as a Transition Indicator message if the mobile wireless communication device is in the Connected mode and is transmitted in the RRC Connection Request message or the RRC Connection Setup Complete message during the connection establishment procedure if the mobile wireless communication device is in Idle mode. For the case of re-establishment, the RRC Connection Re-establishment Request message would be used instead. In some circumstances, the mobile wireless communication device sends the speed threshold indicator in response to a request by the network. The speed threshold indicator may include information that indicates that the estimated speed is above or below a threshold. Since the estimated speed is based on the counted number of handover crossings within a time period, such information indicating that the estimated speed is above or below a threshold is an indication of the number of handover crossings in a time period. Alternately, the information may indicate that the estimated speed is above the threshold by being present in the message. For example, the system may be configured such that the speed threshold indicator field contains one of two values in some circumstances while other implementations may include only transmitting a message with the speed threshold indicator when the threshold is exceeded or met. If the controller determines that the mobile wireless communication device is traveling faster than the speed threshold, the method continues at step 406. Otherwise, the method returns to step 402 where the network continues to transmit the threshold information.

At step 406, the network acquires location tracking of the mobile wireless communication device. Using location information of the high-speed trains, the network determines which high-speed train is carrying the mobile wireless communication device. The position monitor 148 provides the network with information such as the locations and speeds of the high-speed trains. The network applies the communication history of the mobile wireless communication device to the position and timing of the trains to identify the train. After the train is identified, the network continues to track the mobile wireless communication device by tracking the train using the position information provided by the position monitor 148. In some situations, the mobile wireless communication device provides information to the network to assist the network in identifying the train. For example, the mobile wireless communication device may transmit information regarding the order that cell boundaries were crossed to allow the network to determine the direction that the mobile wireless communication device is traveling. Alternatively, the network can track the direction and location of the wireless communication device by using the history of the mobile wireless communication device's handovers and the cells that were involved in previous handovers.

At step 408, the mobile wireless communication device is instructed to use the transition procedure instead of the handover procedure. The network transmits a transition procedure instruction message that indicates to the mobile wireless communication device that is should use a transition procedure when changing cells instead of the handover procedure. An example of a suitable message includes a one-bit indicator within a dedicated RRC signaling message that toggles the mobile wireless communication device between using the transition procedure and the conventional handover procedure.

Figure 5:
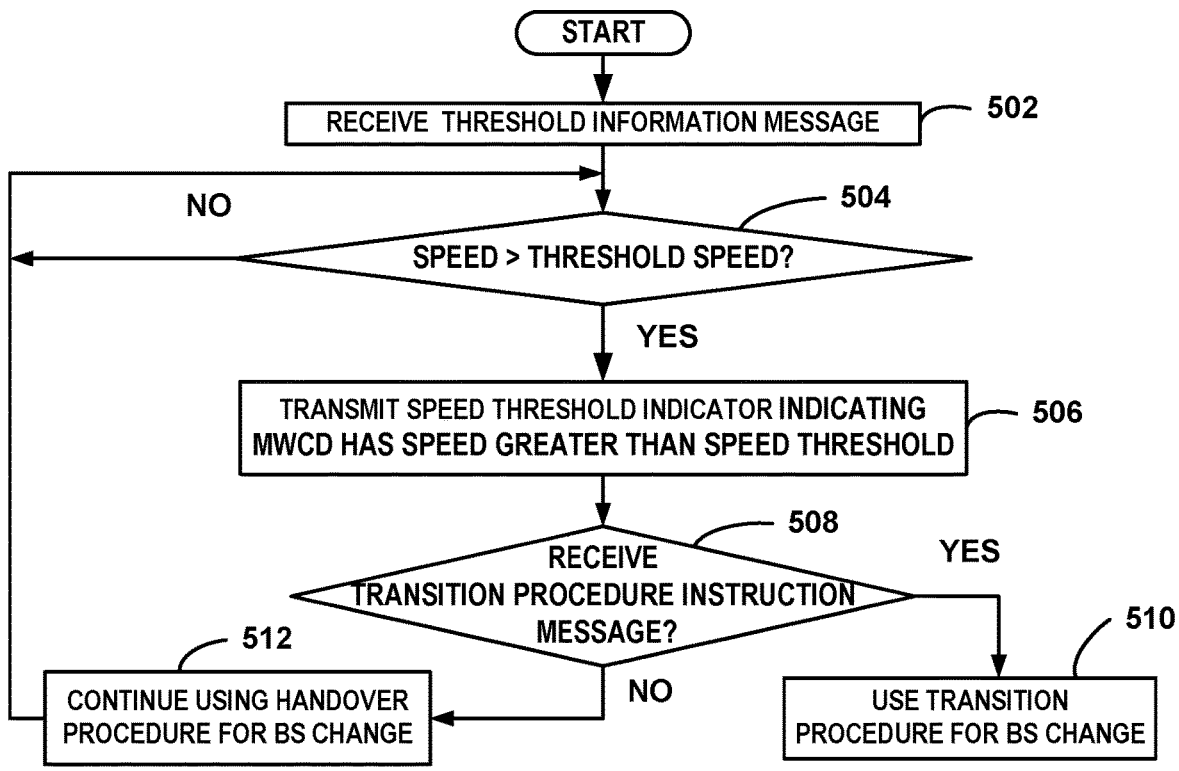
FIG. 5 is a flowchart of a method of managing handovers based on the speed of a mobile wireless communication device performed at the mobile wireless communication device.

FIG. 5 is a flowchart of a method of managing handovers based on the speed of a mobile wireless communication device performed at the mobile wireless communication device.

At step 502, the mobile wireless communication device receives the threshold information message. The mobile wireless communication device monitors the signals broadcast from the base stations to receive the message.

At step 504, it is determined whether the speed of the wireless communication device is greater than the threshold speed. The controller 304 in the wireless communication device 120 applies the threshold information to the observed data. An example for determining whether the speed is above the threshold is discussed with reference to FIG. 6 below. Other techniques, however, may be used. If the speed is greater than the speed threshold, the method continues at step 506. Otherwise, the method continues to monitor the events.

At step 506, the network is informed that the mobile wireless communication device has a speed greater than the speed threshold. For the examples, the speed threshold indicator is transmitted to the serving base station 116. The speed threshold indicator indicates that the mobile wireless communication device has speed greater than the threshold speed.

At step 508, the mobile wireless communication device determines whether the network has instructed the mobile wireless communication device to use the transition procedure instead of the handover procedure when changing base stations. The mobile wireless communication device monitors the appropriate channel and field for a transition procedure instruction message. If a transition procedure instruction has been received indicating the transition procedure should be used, the method continues at step 510. Otherwise, the method proceeds to step 512 where the mobile wireless communication device continues to perform handovers when changing base stations.

At step 510, the mobile wireless communication device uses the transition procedure when changing base stations. The transition procedure results in fewer delays and more efficient signaling at high speed since measurement reports are not transmitted to the network. Examples of suitable transition procedures include the transparent handover procedure and the group cell monitoring transition procedure discussed herein.

Figure 6:
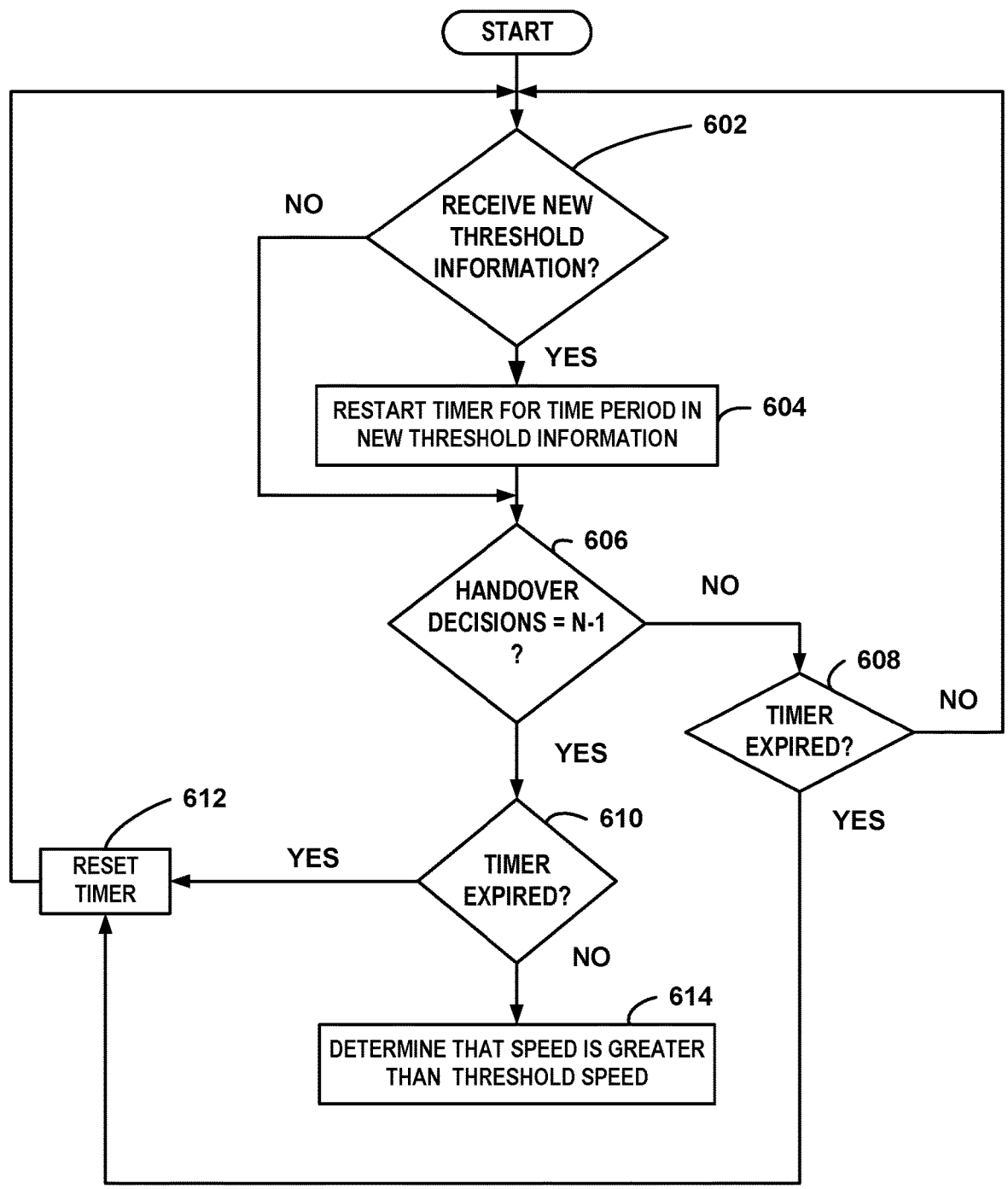
FIG. 6 is a flowchart of an example of a method of determining whether the mobile wireless communication device has a speed greater than a speed threshold.

FIG. 6 is a flowchart of an example of a method of determining whether the mobile wireless communication device has a speed greater than a speed threshold. The method is performed by the mobile wireless communication device.

At step 602, it is determined whether new speed threshold information has been received. The transceiver receives the broadcast signals transmitted by the network and the controller processes and evaluates the signals to extract the speed threshold information and determine if it is different from the information currently stored in memory 308. Although typically changes in the threshold information will occur between base stations, the information may change over time in a single cell. Such changes may be due to vehicle traffic, data traffic, capacity and other factors evaluated by the network. If new information has been received, the method proceeds to step 604. Otherwise, the method continues at step 606.

At step 604, the new speed threshold information is stored and used for evaluation. All counters and timers are reset. For example, the running count of crossed cell boundaries (number of handovers) is reset to zero and the timer for the threshold time period is reset.

At step 606, it is determined whether the number of cell boundary crossings is equal to the threshold number. The threshold number is N-1 where N is the number of base stations the mobile wireless communication device has detected. For the example of FIG. 6, the threshold number is the number of handover decisions that the mobile wireless communication device has encountered. Therefore, the mobile wireless communication device counts the number of handover decisions to new base stations. For the example of FIG. 1, the mobile wireless communication device will count three handover decisions when reaching the fourth base station (N base station) 118. The first handover decision occurs between the first base station 112 and the second base station 114, the second handover decision occurs between the second base station 114 and the third base station 116, and the third handover decision occurs after the measurement report including the fourth base station 118 is received by the network.

If the number of counted handover decisions is equal to the threshold number of handover decisions, the method continues at step 610. Otherwise, the method proceeds to step 608.

At step 608, it is determined whether the timer for the timer period has expired. If the time period has not expired the method returns to step 602. If the timer has expired, the method proceeds to step 612 whether the timer is reset before returning to step 602.

At step 610, it is determined whether the timer for the timer period has expired. If the time period has not expired the method continues to step 614. If the timer has expired, the method proceeds to step 612 whether the timer is rest before returning to step 602.

A step 614, the mobile wireless communication device determines that the speed of the device is greater than the threshold.

Figure 7A:
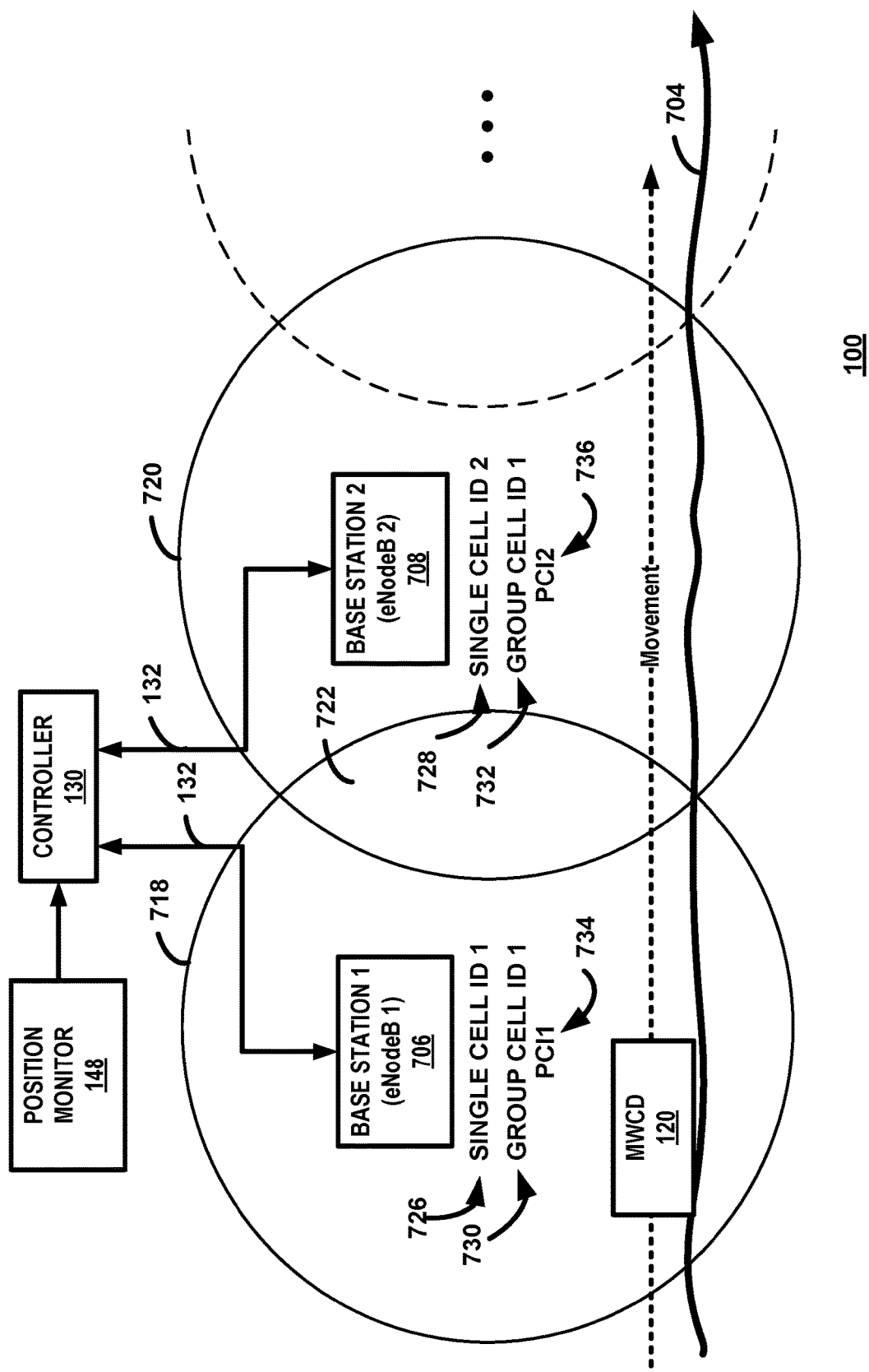
FIG. 7A is a block diagram of a cellular communication system including a mobile wireless communication device that travels along a predetermined path 704 relative to a plurality of base stations.

The discussion with reference to FIG. 7A through FIG. 13 is directed to an example of a group cell ID monitoring transition procedure. FIG. 7A is a block diagram of a cellular communication system 700 including a mobile wireless communication device 120 that travels along a predetermined path 704 relative to a plurality of base stations 706, 708. The various functions and operations of the functional blocks described with reference to the communication system 700 may be implemented in any number of devices, circuits, or elements. Two or more of the functional blocks may be integrated in a single device and the functions described as performed in any single device may be implemented over several devices. For example, at least some of the functions of the controller may be performed by the base stations.

The base stations 706, 708 are fixed transceiver stations, sometimes referred to as eNodeBs or eNBs, which may include controllers in some circumstances. The base station discussed with reference to FIG. 3 is an example of a suitable implementation of the base stations 706, 708. The base stations are connected to a network controller 130 through the backhaul 132 which may include any combination of wired, optical, and/or wireless communication channels. For the examples herein, the network controller 130 includes the functionality of the Mobility Management Entity (MME) and the Packet Gateway (P-GW). As discussed below, at least some of the functions of the network controller 130 may be performed by other devices in the system, such as the base stations, for example. In FIG. 7A, a first base station 706 and a second base station 708 are shown. In a typical implementation, several base stations are arranged along the path 704.

The base stations are positioned along the predetermined path such that the mobile device 120 can communicate with at least one of the base stations at every point along the path. Each base station 706, 708 provides a geographical service area 718, 720 along the predetermined path 704 such that the mobile wireless communication device 120 is within at least one of the geographical services areas at every point along the path. At some positions, the mobile wireless communication device 120 is within two geographical service areas at the same time. For example, the mobile wireless communication device 120 may be within two geographical service areas when positioned within the region 722 where the two areas overlap. Each of the base stations along the path transmits a single cell identifier (single cell ID) 726, 728 and a group cell identifier (group cell ID) 730, 732 where the group cell ID 730, 732 is the same for all base stations and the single cell ID 726, 728 is unique to each base station 706, 708. In addition, each base station also transmits a Physical Cell ID (PCI) 734, 736 that is at least unique relative to other base stations in the region. For the examples, the PCI 734, 736 is transmitted within the primary sync channel in accordance with the 3GPP LTE communication standard. The group cell ID and the single cell ID are broadcast in a System Information Block Type 1 Message (SIB1 message). The 3GPP LTE standard at the time of the filing of this patent application specifies only one cell identifier which is referred to as a Cell ID. In accordance with the embodiments herein, the SIB1 message is enhanced from the current standards such that the message also includes a Group Cell ID field. The conventional Cell ID field is utilized as the single cell ID and the Group Cell ID field is used for the group cell ID in the embodiments discussed herein.

The mobile wireless communication device 120 engages in the group cell ID monitoring transition procedure where the mobile wireless communication device 120 does not engage in handovers between the base stations along the predetermined path. For the examples, the restricted handover procedure (group cell ID monitoring transition procedure) is invoked when the speed of the group cell ID monitoring transition procedure relative to the base stations exceeds the speed threshold. The mobile wireless communication device 120 monitors the group cell ID as well as the PCI during the restricted handover procedure but does not send a measurement report in response to detecting a change in the PCI between a source base station (first base station) 706 and a target base station (second base station) 708 when the group cell ID is the same for the two base stations. For the example of FIG. 7A, the mobile wireless communication device 120 engages in the transition procedure where communication between the mobile wireless communication device 120 and the first base station transitions to communication between the mobile wireless communication device 120 and the second base station. Although the network side of the transition is similar to a handover, the transition procedure is not characterized as a handover because over-the-air messaging between the mobile wireless communication device 120 and the base stations is omitted during the transition procedure. The first base station, however, can still be referred to as a source base station and the second base station can still be referred to as target base station since the transition procedure involves transition of connectivity between the mobile wireless communication device 120 and the base stations.

As described below with reference to FIG. 7B, transition procedures are typically managed by the base stations. The network controller 130 provides a position trigger to initiate a transition of the mobile wireless communication device 120 from one base station to another. In some circumstances, however, the network controller 130, or multiple network controllers 130, can coordinate the transition. For the examples described herein, the network controller 130 generates the position trigger based on the position information received from the position monitor 148 to initiate the transition procedure but does not otherwise manage the transition. The base stations exchange messages to perform the transition of the mobile wireless communication device 120 from the first base station to the second base station. Messaging performed within the system during the transition procedure is discussed in further detail with reference to FIG. 7B. In the typical handover operation, the source base station (first base station 706) communicates directly with the target base station (second base station 708) over the X2 interface without additional management by the network controller 130. In situations where a direct link between the base stations is not available (i.e., no X2 link) or the base stations are associated with different network controllers 130, the network controller(s) 130 assist with transition procedures and handover procedures by routing the transition messages and handover messages from the source base station to the target base station. As discussed below in further detail, the controller 130 instructs the mobile wireless communication device 120 to invoke the restricted handover procedure and to monitor a group cell ID 730, 732 when the speed of the mobile wireless communication device relative to the base stations exceeds the threshold speed. When the mobile wireless communication device 120 is traveling at high speed (a speed above the threshold) and monitoring the group cell ID, the mobile wireless communication device 120 does not engage in the handovers between the base stations but rather engages in the transition procedure. Each base station communicates with the mobile wireless communication device 120 as it travels through the service areas 718, 720 of the base stations 706, 708. The communication system uses at least position information to accurately time transmissions and to allocate communication resources for the mobile wireless communication device 120 at the appropriate times to facilitate continued communication as the mobile wireless communication device 120 travels from cell to cell. For the examples, the first base station and the second base station exchange transition procedure messages to manage the transition of the mobile wireless communication device 120 from the first base station to the second base station. In some situations, it may be necessary, or preferred, to allocate at least some management to the network controller 130. For example, the controller 130 may be tasked with managing communication between the base stations 706, 708 and the mobile wireless communication device 120 such that each base station transmits signals to the mobile wireless communication device 120 at the appropriate times and allocates resources for receiving signals from the mobile wireless communication device 120 when the mobile wireless communication device 120 is in the service area of the base station. In the examples discussed herein, the mobile wireless communication device 120 does not provide information to the network controller 130 regarding its position when the restricted handover procedure is invoked. Instead, the network controller 110 obtains position information from a position monitor 148 and generates the position trigger at least partially based on the received information.

The position monitor 148 may be any infrastructure or mechanism that provides the controller 130 and/or the base stations 706, 708 with adequate information for managing the timing of the communication between the base stations and mobile wireless communication devices. For the examples where the mobile wireless communication device 120 is carried on a high-speed train, infrastructure used for monitoring the position and speed of the train is used as the position monitor 148 for the communication systems. One example of such an infrastructure includes The European Train Control System (ETCS) which is a standardized solution for signaling, control and monitoring of high-speed trains. In the case of Level 2 ETCS, all trains automatically report their exact position and direction of travel to the Radio Block Centre (RBC) at regular intervals. Train movements are monitored continually by the radio block centre. Another example of infrastructure that monitors train position includes the Italian Sistema Controllo Marcia Treno (SCMT). Sensors/Transponders are placed at various points on the track. When the train passes the information point, it is provided information about the next signal and other information. Such a system can be implemented to provide information regarding the position of the train. In some situations where the base stations manage the handovers, the position information may be provided directly to the base stations. For the examples discussed herein, however, the position information is received at the network controller 130 and the position trigger generated based on the position information. The position trigger is provided to the base stations to initiate the transition procedure. The controller 130 provides the position trigger to the source base station (first base station 706) where the position trigger indicates when to initiate transition of the mobile wireless communication device 120 from the source base station to the target base station. Accordingly, the source base station triggers the transition of the mobile wireless communication device 120 to the target base station in response to receipt of the position trigger. As mentioned above, however, the position information may be provided directly from the position monitor 148 to the base stations. In such a situation, the source base station (first base station) determines when to initiate the transition based on the transition information.

As explained above, the restricted handover procedure eliminates the over-the-air signaling between the mobile wireless communication device 120 and the base station that would be present in a conventional handover. From the network perspective, however, a "handover" is still executed as the transition procedure since the source base station needs to inform the target base station of the transition of the mobile wireless communication device 120 to the next base station in response to the position trigger received from the controller 130.

Figure 7B:
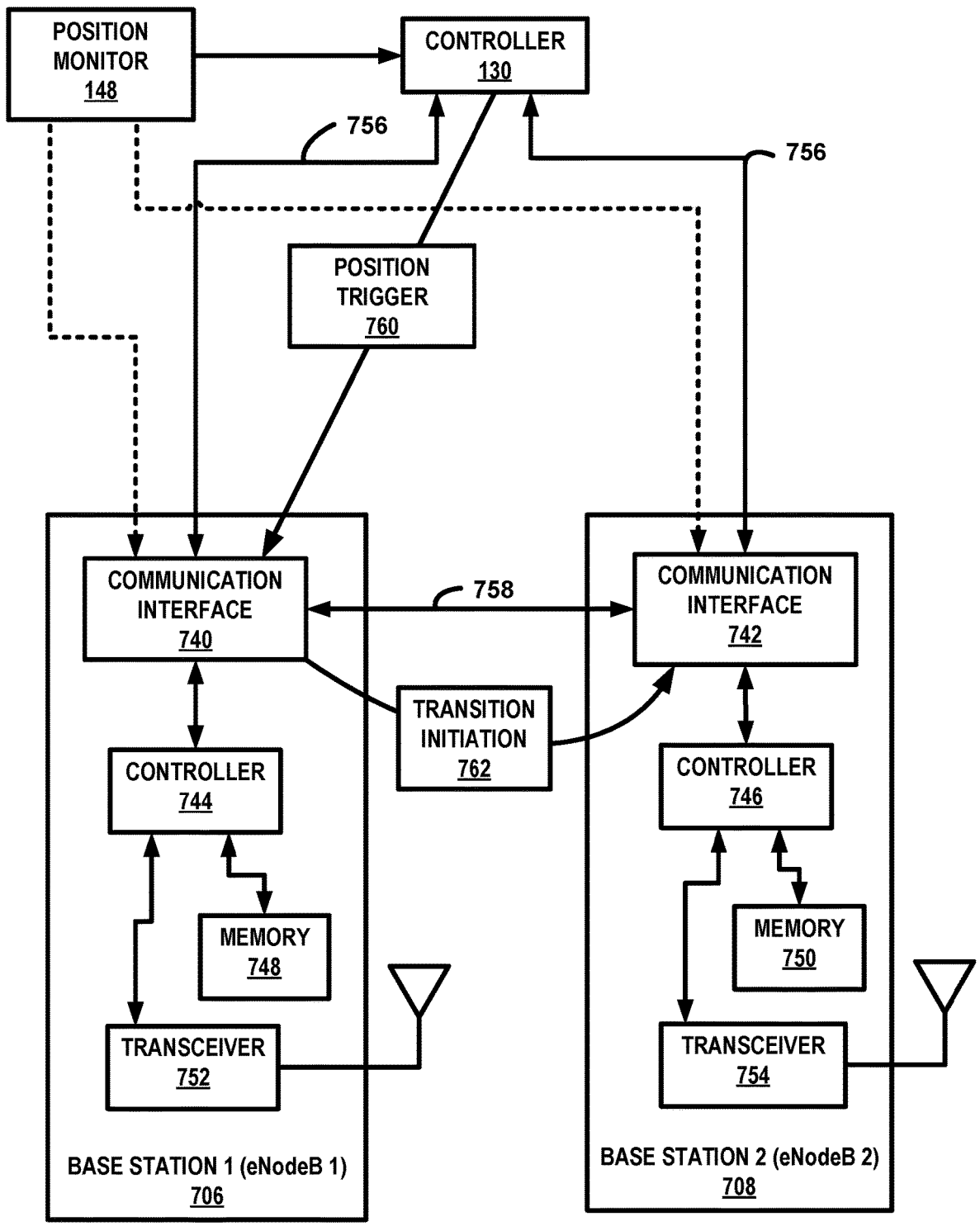
FIG. 7B is a block diagram of the first base station and the second base station connected to a controller.

FIG. 7B is a block diagram of the first base station 706 and the second base station 708 connected to a controller 130. Each base station includes a communication interface (202) 740, 742, a controller (206) 744, 746, a memory (208) 750, 752, and a transceiver (204) 754, 756 as well as other components and circuitry (not shown). Each of the transceivers 740, 742 transmits downlink wireless signals to mobile wireless communication devices and receives uplink wireless signals from mobile wireless communication devices. Each controller 744, 736 controls components of the base station to manage the functions of the base station and facilitate the functions described herein as well as the overall functionality of the base station 706, 708. Each controller 744, 746 is connected to a memory 748, 750 which can be any suitable memory storage device capable of storing code and data. For the examples, each communication interface 740, 742 communicates with the network controller 130 and other base stations. The communication links between the network controller and the communication interface are in accordance with S1 signaling protocols and techniques while the communication links between base stations are in accordance with X2 signaling protocols and techniques. Accordingly, the network controller 130 is connected to the base stations through S1 communication links 756 and the base stations are connected to each other through an X2 communication link 758. Other communication links can be used in some circumstances.

In the example, the network controller 130 generates a position trigger 760 based on the position information provided to the network controller 130 by the position monitor 148. The position trigger 760 is sent to the communication interface 740 of the first base station (source base station) using S1 signaling. The controller 744 in the first base station 706 uses the position trigger 760 to initiate the transition of the mobile wireless communication device 120 from the first base station to the second base station (target base station). The communication interface 740 sends a mobile wireless communication device 120 transition initiation message 762 to the communication interface 742 of the second base station using X2 signaling. For the examples herein, the mobile wireless communication device transition initiation message 762 is similar to a handover request message in conventional schemes. The messaging between the base stations to facilitate the transition of the mobile wireless communication device 120 from the first base station to the second base station is consistent with the messaging performed in a conventional system performing a handover.

Figure 8:
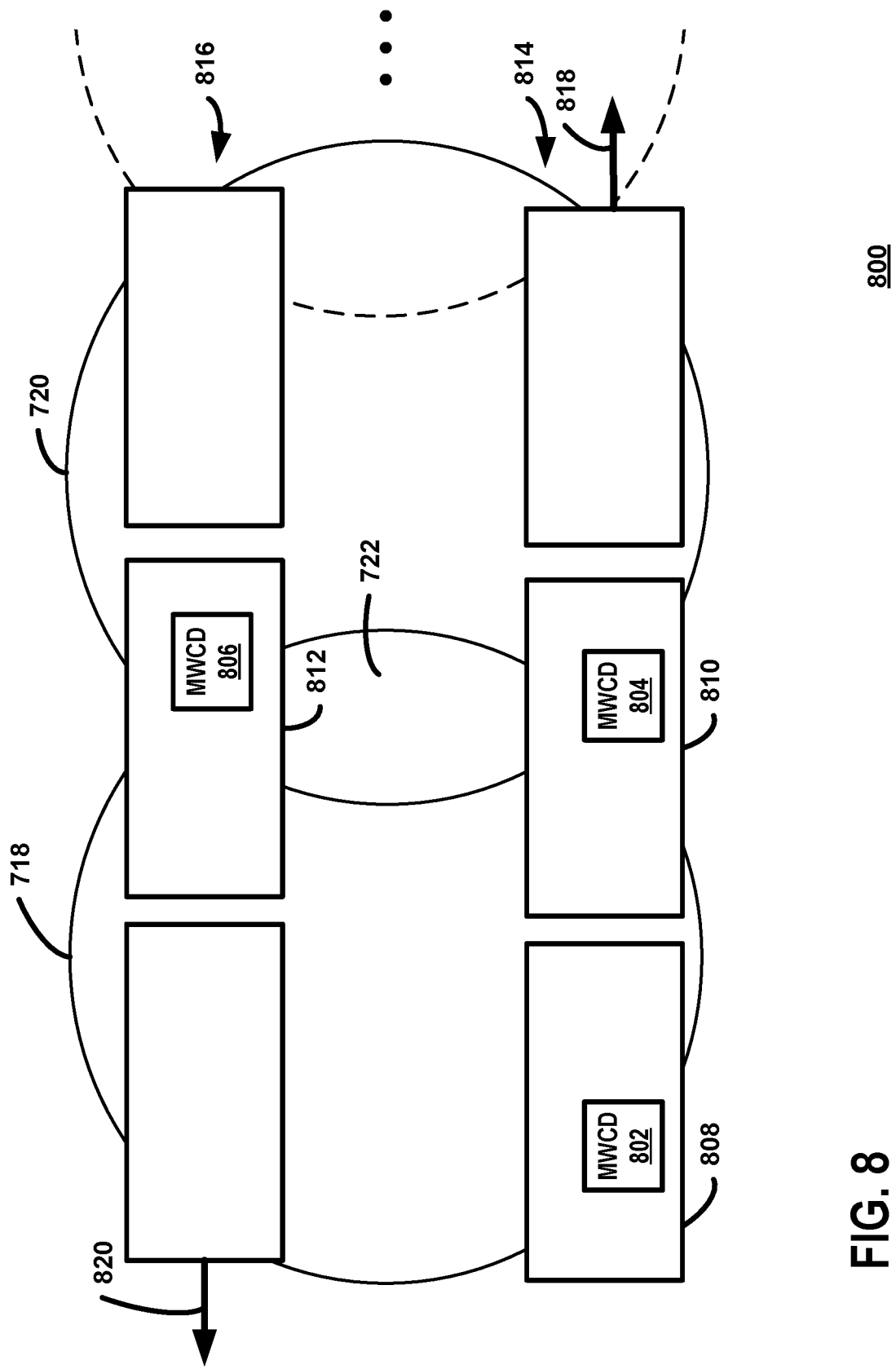
FIG. 8 is an illustration of a communication system for an example where mobile wireless communication devices are located on or in train cars of high-speed trains.

FIG. 8 is an illustration of a communication system 800 for an example where mobile wireless communication devices 802, 804, 806 are located on or in train cars 808, 810, 812 of high-speed trains 814, 816. In some circumstances, the system 800 can be implemented to accommodate trains traveling in opposite directions. In FIG. 8, for example, a first train 814 is traveling in one direction 818 and a second train is traveling in a second direction 820. The rail in this example is the predetermined path 104 of FIG. 7A.

When stationary, the mobile wireless communication devices 802, 804, 806 use the single cell ID of the base station for communication and monitor the sync channel to acquire the PCIs from neighboring base stations that are within range. The mobile wireless communication devices 802, 804, 806 continue to monitor the sync channel and receive the PCIs as they begin to move. If a PCI is received that does not match a currently stored PCI, the mobile wireless communication devices 802, 804, 806 send a measurement report to the base station (source base station) currently serving the particular mobile wireless communication device. The source base station (e.g., first base station) configures the mobile wireless communication device 802, 804, 806 to send a measurement report based on the newly discovered PCI of the target cell base station. Based on the results, the source base station determines if a handover should be performed. When warranted, handover procedures are executed to move the mobile wireless communication devices 802, 804, 806 to new target base stations along the path. For the example discussed herein, this handover management is used when the mobile wireless communication devices 802, 804, 806 are traveling at a speed less than or equal to the speed threshold. When the mobile wireless communication device has a speed that exceeds the threshold, the restricted handover procedure (Group cell ID monitoring transition procedure) is used to manage communication between the mobile wireless communication devices 802, 804, 806 and the base stations.

During the restricted handover procedure, the mobile wireless communication device 802, 804, 806 continues to monitor the sync channel and receive the PCIs. The mobile wireless communication device 802, 804, 806, however, does not report detected changes in PCI to the source cell base station. The PCIs are received and used for communicating with the base stations. The mobile wireless communication devices 802, 804, 806 monitor the group cell ID transmitted by the base stations and only invoke a handover procedure if a newly received group cell ID differs from the current group cell ID.

Figure 9:
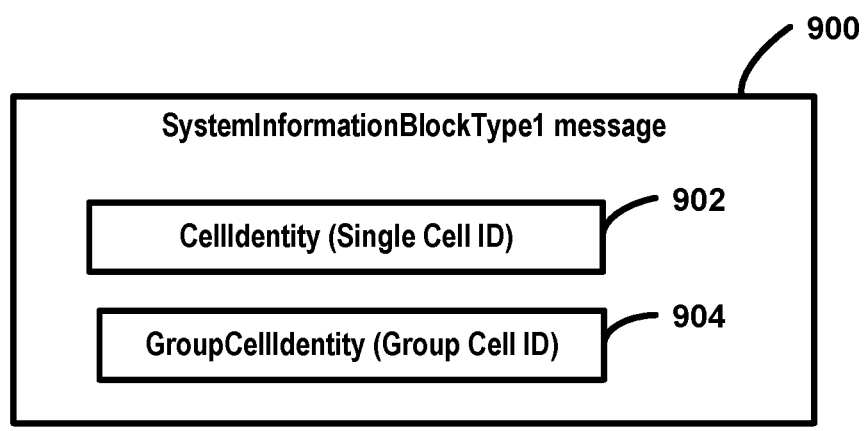
FIG. 9 is a block diagram of an example of system information block type 1 message suitable for broadcasting the single cell ID and the group cell ID.

FIG. 9 is a block diagram of an example of system information block type 1 message (SIB1 message) suitable for broadcasting the single cell ID and the group cell ID. As discussed above, the group cell ID and the single cell ID are broadcasted in a System Information Block Type 1 Message (SIB1 message) 900 that is modified from the current 3GPP LTE specification. For the examples, the SIB1 message 900 is a modified version of the SIB1 message defined by 3GPP in TS 36.331. For the examples herein, the SIB1 message 900 conforms to the current 3GPP LTE specification with the exception that it includes a Group Cell ID field 904. The Cell ID field specified by the current standard is used at the Single Cell ID field 902. Accordingly, the single cell ID 726, 728 is transmitted within the single cell ID field 902 and the group cell ID 730, 732 is transmitted in the Group Cell ID field 904.

Figure 10:
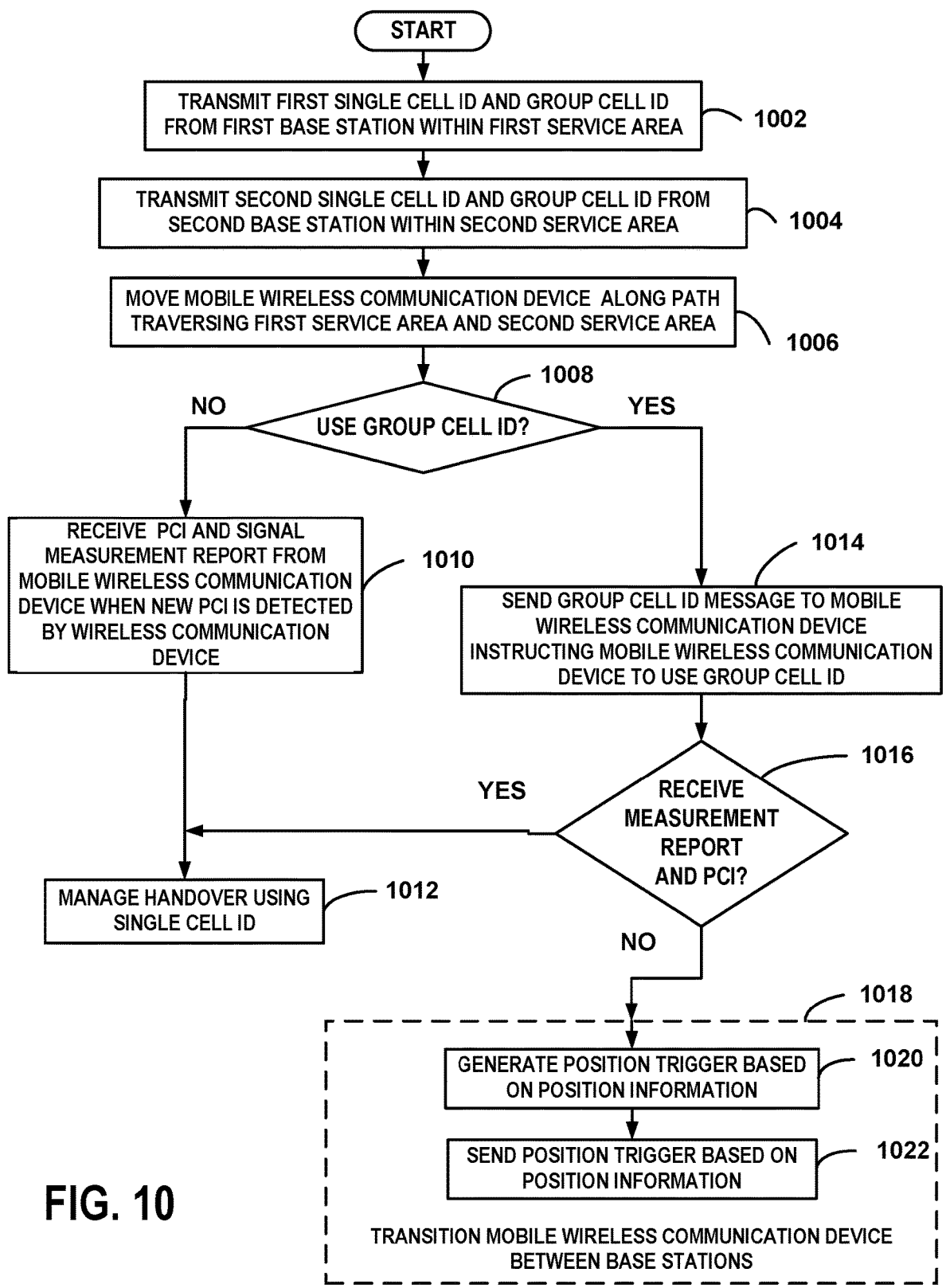
FIG. 10 is a flowchart of a method performed in a network of a wireless communication system with a mobile wireless communication device.

FIG. 10 is a flowchart of a method performed in a network of a wireless communication system with a mobile wireless communication device. Although the method may be implemented in other systems in some circumstances, the example discussed with reference to FIG. 10 is performed in the system of FIG. 7A. Accordingly, the method is performed in accordance with 3GPP LTE communication specifications. The method is discussed with reference to two base stations. During typical operation, however, the method is repeated as the mobile wireless communication device travels along the path. When the mobile wireless communication device moves toward a third base station adjacent to the second base station, the second base station can be referred to as a first base station and a third base station is interpreted as the second base station in the exemplary methods described herein.

At step 1002, a first single cell ID and a group cell ID is transmitted within the first service area by the first base station. The first base station transmits a S1B1 message 900 that includes the Single Cell ID (902) representing the single cell ID 726 of the first base station and includes the Group Cell ID 904 representing the group cell ID 730 of the first base station.

At step 1004, a second single cell ID and the group cell ID is transmitted with a second service area by the second base station. The second base station transmits a S1B1 message 900 that includes the Single Cell ID (902) representing the single cell ID 728 of the second base station and includes the Group Cell ID 904 representing the group cell ID 732 of the second base station. Since the group cell ID 730 of the first base station is the same as the group cell ID 732 of the second base station, the base stations transmit different single cell IDs and transmit the same group cell ID.

At step 1006, the mobile wireless communication device is moved along the path traversing the first service area and the second service area. Where the system is implemented within a high-speed rail system, the mobile wireless communication device is located within a train car and, therefore, follows the same path as the train. As discussed above, the service areas at least partially overlap and are provided by adjacent base stations arranged along the pre-determined path.

At step 1008, it is determined whether the group cell ID should be monitored for purposes of handover management. The network evaluates the speed of the mobile wireless communication device to determine whether the group cell ID or the single cell ID should be monitored by the mobile wireless communication device. If the speed is greater than the threshold, it is determined that the group cell ID should be monitored. It is determined that the single cell ID should be used when the speed is below or equal to the threshold. For the examples, the network determines that the speed of the mobile device is above the threshold when the speed threshold indicator is received from the mobile wireless communication device as discussed above. The network also determines whether location tracking has been acquired. If location cannot be acquired by the network, it is determined that the single cell ID should be monitored. If it is determined that the group cell ID should be used for changing base stations, the method proceeds to step 1014. Otherwise, the method continues at step 1010.

At step 1010, a signal measurement report is received from the mobile wireless communication device at the first base station after a new physical cell ID (PCI) is detected by the mobile wireless communication device. In accordance with known techniques, the mobile wireless communication device monitors the sync channel for the PCI. The mobile wireless communication device compares the PCI received from the second base station to the PCI in memory which, for the example, is the PCI of the first base station. When the mobile wireless communication device detects that the PCI do not match, the mobile wireless communication device measures a signal strength of a reference signal from the second base station. A measurement report containing the measurement and the PCI are sent to the first base station (source base station) if the signal level of the reference signal exceeds the pre-configured threshold.

At step 1012, the network manages the handovers based on the single cell ID. The handover procedure, therefore, is in accordance with the conventional procedures used for handovers of mobile wireless communication devices. Depending on the particular circumstances, the network may instruct the mobile wireless communication device to read the single cell ID from the SIB1 and report the results. Typically, the controller instructs the mobile wireless communication device to acquire, using the new PCI, the single cell ID that is broadcast in the SIB1 message. The information is used to uniquely identify the second base station before proceeding with the handover operation.

At step 1014, a group cell ID message is sent to the mobile wireless communication device to instruct the mobile wireless communication device to use the group cell ID. The group cell ID message is an example of the transition procedure instruction message discussed above. Various techniques may be used to inform and manage the mobile wireless communication device in order that the mobile wireless communication device monitors the appropriate cell ID. In the examples herein, the mobile wireless communication device uses the single cell ID as a default and is instructed to use the group cell ID when the speed exceeds the threshold. If the network controller 130 determines that the single cell should be used again, the controller 130 instructs the mobile wireless communication device to use the single cell ID. Various techniques may be used to instruct the mobile wireless communication device. An example of a suitable technique includes using dedicated RRC messages to inform the mobile wireless communication device of the change. Accordingly, the controller sends, through the base stations, a dedicated RRC message to instruct the mobile wireless communication device which cell ID to monitor.

At step 1016, the controller within the network determines whether a measurement report and PCI have been received from the mobile wireless communication device. As explained below in further detail, the mobile wireless communication device monitors the sync channel for the PCI as well as the group cell ID in the SIB1. If the PCI changes and the SIB1 from the second base station does not contain the stored (or contains a different) group cell ID, the mobile wireless communication device measures the reference signal of the second base station and sends a measurement report, as well as the newly received PCI, to the first base station according to the conventional operation. If the PCI changes and the group cell ID matches, the mobile wireless communication device does not send a measurement report. If a measurement report is received from the mobile wireless communication device, the method continues at step 1012, where handovers are managed using the single cell ID in accordance with conventional handover procedures. Therefore, there may be circumstances where the mobile wireless communication device transmits the measurement report when monitoring the group cell ID. The mobile wireless communication device may detect an alternate base station having a significantly high reference signal that is not the next base station in the mobile wireless communication device path. The alternate base station may have a different group cell ID or may not be transmitting any group cell ID. For example, a base station near the path, but not necessarily intended to serve the mobile wireless communication device, may not be configured to transmit a group cell ID. If it is determined that no measurement report has been received from the mobile wireless communication device, the method continues at step 1018.

At step 1018, the mobile wireless communication device is transitioned between the base stations along the path without performing handovers. The transition procedure is performed where the base station serving the mobile wireless communication device is changed based on the position of the mobile wireless communication device without the mobile wireless communication device engaging in over-the-air handover messages.

At step 1020, the network controller 130 generates a position trigger based on position information received from the position monitor 148. As described above, the position information is information that indicates the position of the mobile wireless communication device and may be derived or based on information available from high-speed train infrastructure that tracks the position of the train.

At step 1022, the position trigger 760 is transmitted to the first base station (source base station) to initiate the transition procedure. The position trigger 760, therefore, notifies the source base station that the mobile wireless communication device should be transitioned to the next base station. In response to the position trigger 760, the first base station sends the mobile wireless communication device transition initiation message 762 to the second base station to inform the second base station of the transition procedure. The second base station allocates time-frequency resources for uplink and downlink communication with the mobile wireless communication device. The transition procedure between the first base station and the second base station does not require any input from the mobile wireless communication device as is needed in the conventional handover procedures. The mobile wireless communication device uses the PCI of the second base station as needed for communication but does not initiate a handover procedure when entering the second service area. Accordingly, the mobile wireless communication device exchanges data signals with the first base station followed by exchanging data signals with the second base station without sending a measurement report or otherwise performing a handover procedure.

Figure 11:
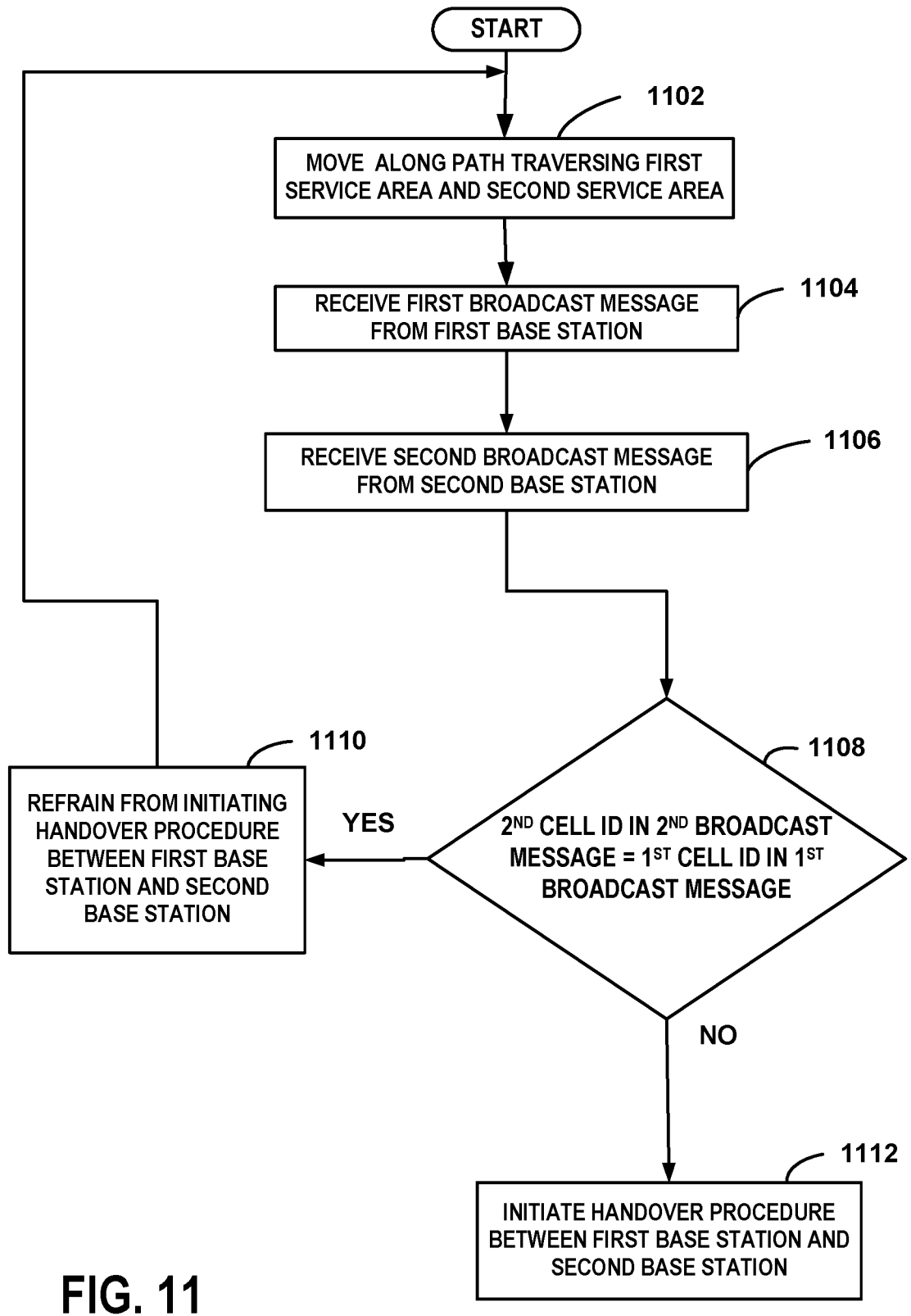
FIG. 11 is a flowchart of a method performed in a mobile wireless communication device of a wireless communication system.

FIG. 11 is a flowchart of a method performed in a mobile wireless communication device of a wireless communication system. The method facilitates a restricted handover procedure where the mobile wireless communication device refrains from exchanging messages with the base stations when transitioning between the service areas. Although the method may be implemented in other systems in some circumstances, the example discussed with reference to FIG. 11 is performed in the mobile wireless communication device 120. Accordingly, the method is performed in accordance with 3GPP LTE communication specifications. The method is discussed with reference to two base stations. As discussed above, the method is typically repeated as the mobile wireless communication device travels along the path.

At step 1102, the mobile wireless communication device is moved along the path traversing the first service area and the second service area. Where the system is implemented within a high-speed rail system, the mobile wireless communication device is within a train car and, therefore, travels the same path as the train. As discussed above, the service areas at least partially overlap and are provided by adjacent base stations arranged along the pre-determined path.

At step 1104, a first broadcast message is received from the first base station. For the examples herein, the first broadcast message is a SIB1 message 900 that includes a single cell ID 902 and a group cell ID 904.

At step 1106, a second broadcast message is received from the second base station. The second broadcast message is a SIB1 message 900 that includes at least a single cell ID 902 and may also contain a group cell ID 904.

At step 1108, it is determined whether the group cell IDs in the first broadcast message and the second broadcast message match. The cell IDs are determined to match if contents of the group cell ID fields in the SIB1 messages are the same. If the group cell ID field does not exist in the second SIB1 message, it is determined that there is not a match. If there is a match, the method returns to step 1102 where the mobile wireless communication device continues moving and monitoring the group cell ID. Accordingly, in returning to step 1102, the mobile wireless communication device refrains from initiating a handover procedure at step 1110. If the cell IDs do not match, the method continues at step 1112.

At step 1112, the mobile wireless communication device initiates a handover procedure by sending a signal measurement report to the first base station. The network responds with a message instructing the mobile wireless communication device to read the single cell ID and report the results. The handover is performed in accordance with conventional techniques for managing handovers with mobile wireless communication devices. In some situations, a handover procedure is not executed or completed. Therefore, the network may not respond with instructions relating to completing a handover when the signal measurement report is sent by the mobile wireless communication device.

Figure 12:
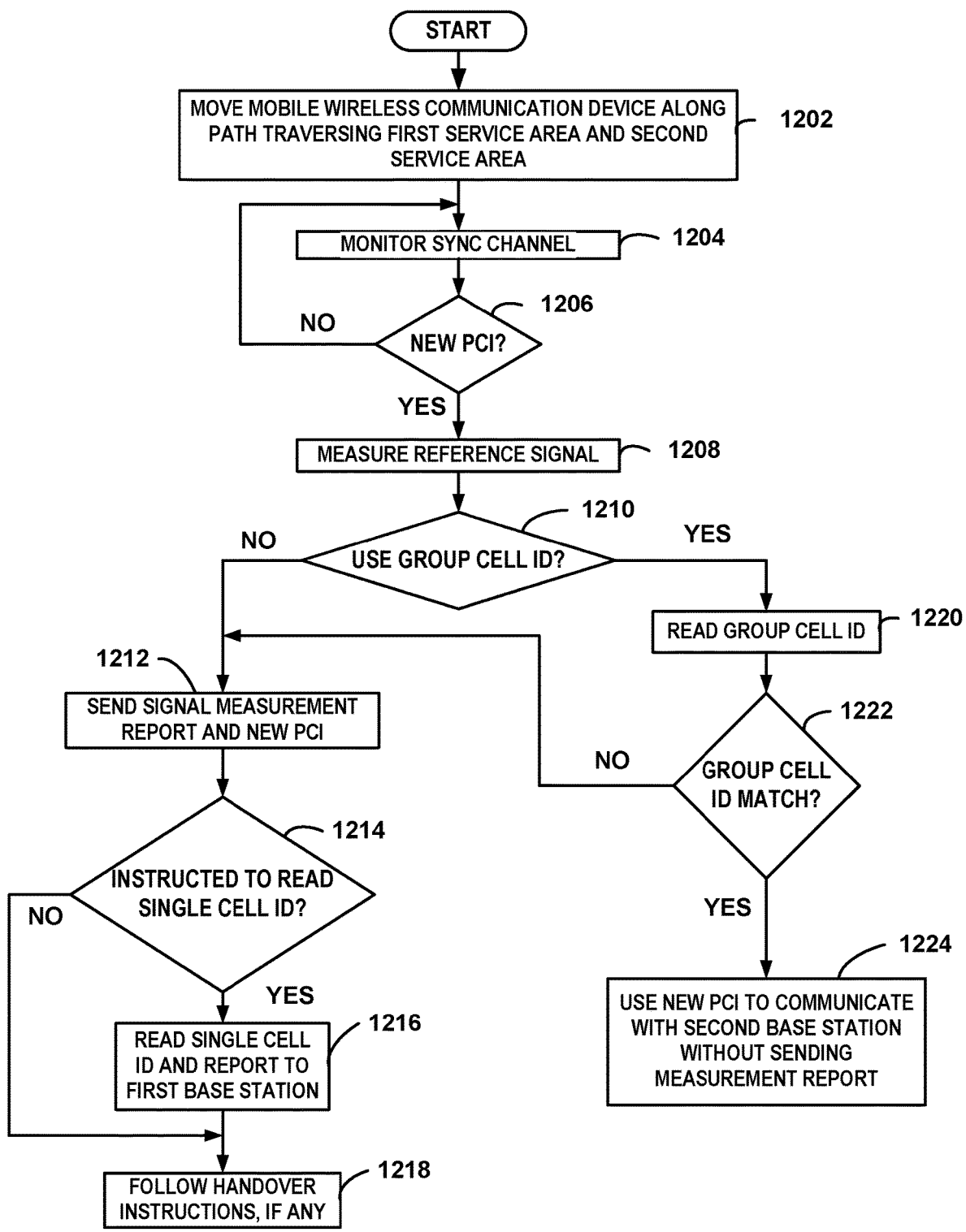
FIG. 12 is a flowchart of an example of implementing the method discussed with reference to FIG. 11.

FIG. 12 is a flowchart of an example of implementing the method discussed with reference to FIG. 11.

At step 1202, the mobile wireless communication device is moved along the path traversing the first service area and the second service area.

At step 1204, the mobile wireless communication device monitors the sync channel. In accordance with known techniques, the mobile wireless communication device receives signals transmitted from nearby base stations and deciphers the sync channel to obtain the PCI of the transmitting base station.

At step 1206, the mobile wireless communication device determines whether a new PCI has been received. The most recently received PCI is compared to the PCI stored in memory. If the PCIs match, it is determined that the PCI is not new and has been received by the currently serving base station (first base station). The mobile wireless communication device continues to monitor the sync channel. If the PCI is new, the method continues at step 1208.

At step 1208, a reference signal corresponding to the new PCI is measured.

At step 1210, the mobile wireless communication device determines whether the group cell ID should be used for handovers. If an instruction from the network has been received instructing the mobile wireless communication device to use the group cell ID, the method continues at step 1220. Otherwise, the method proceeds to step 1212.

At step 1212, the mobile wireless communication device sends the measurement report including the measurement of the reference signal to the first base station. The PCI is also transmitted.

At step 1214, the mobile wireless communication device determines if the network has instructed the mobile wireless communication device to read and report the cell ID (single cell ID) of the base station transmitting the new PCI (e.g., second base station). If the mobile wireless communication device has been instructed to read and report the single cell ID, the method continues as step 1216 where the cell ID is read and reported to the first base station. Otherwise, the method proceeds to step 1218 where the mobile wireless communication device follows any handover instructions provided by the network.

At step 1220, the mobile wireless communication device reads the group cell ID from broadcast messages. The group cell ID from a first SIB1 message sent from the first base station is read and stored in memory. As the mobile wireless communication device continues traveling along the path, the mobile wireless communication device continues to monitor the group cell ID field in the SIB1 messages as well as the sync channel. When the second SIB1 message is received from the second base station, the group cell ID field is evaluated to read the second group cell ID.

At step 1222, it is determined whether the first group cell ID matches the second group cell ID. The group cell IDs are determined to match if contents of the group cell ID fields in the SIB1 messages are the same. If the group cell ID field does not exist in the second SIB1 message, it is determined that there is not a match. If there is a match, the method continues at step 1224 where the newly detected PCI is used to communicate with the second base station without sending a measurement report to the first base station. If the group cell IDs do not match, the method proceeds to step 1212 where the signal measurement report is sent to the first base station to potentially initiate the handover procedure.

Figure 13:
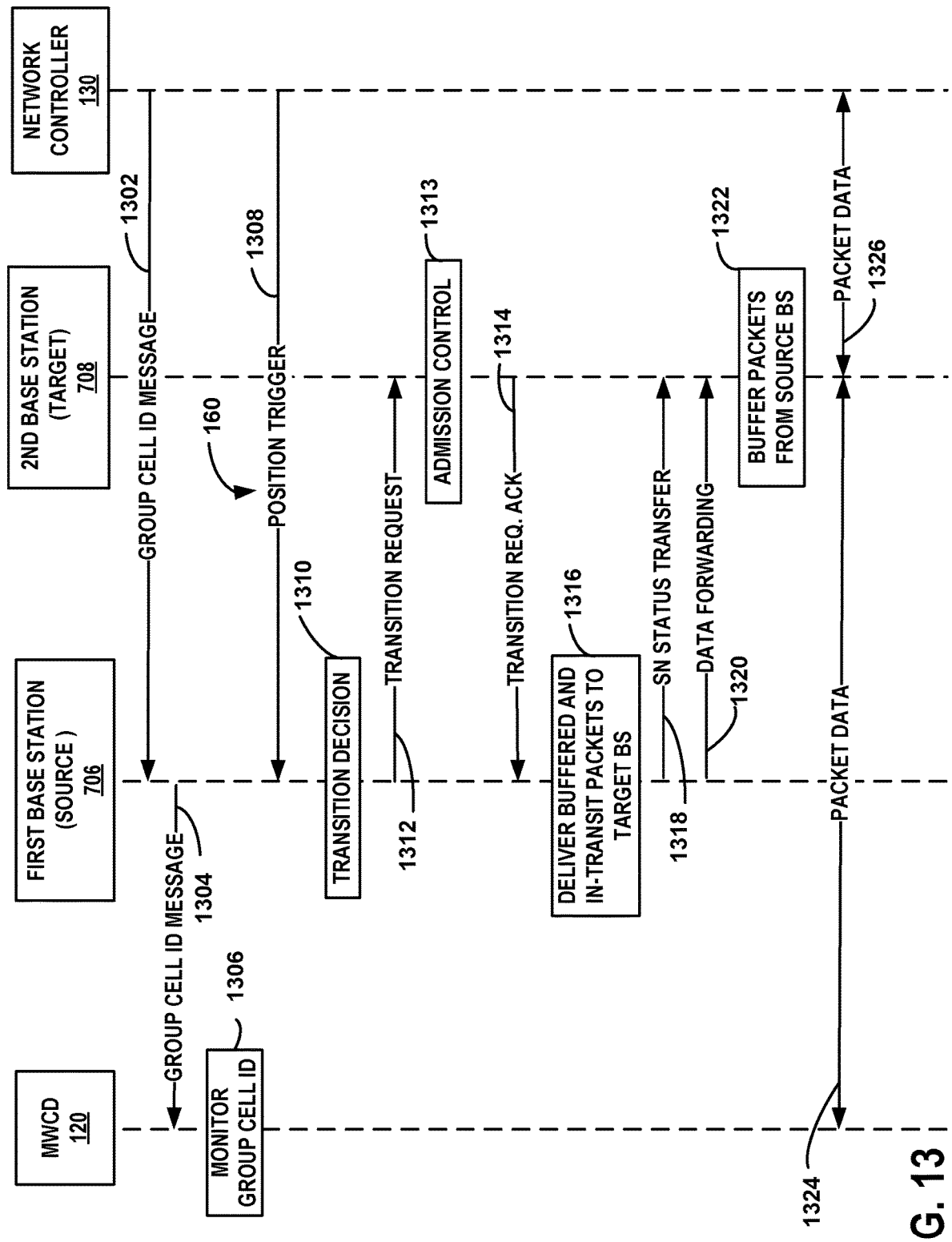
FIG. 13 is a message and event diagram in the cellular communication system where the diagram illustrates at least some of the messages and events that place the mobile wireless communication device in the restricted handover state and that occur during a transition procedure when the mobile wireless communication device is engaged in the restricted handover procedure

FIG. 13 is a message and event diagram in the cellular communication system where the diagram illustrates at least some of the messages and events that place the mobile wireless communication device in the restricted handover state and that occur during a transition procedure when the mobile wireless communication device is engaged in the restricted handover procedure.

At event 1302, the network controller 130 sends a group cell ID message to the base station currently serving the mobile wireless communication device. The example of FIG. 13 begins with the mobile wireless communication device communicating with the first base station 706. Accordingly, the group cell ID message is sent to the first base station 706. At event 1304, the first base station 706 forwards the group cell ID message to the mobile wireless communication device 120. As discussed above, a suitable technique for transmitting the message includes transmitting the group cell ID message as an RRC message from the first base station 706.

At event 1306, the mobile wireless communication device 1306 determines that the group cell ID should be monitored. In response to the group cell ID message, the mobile wireless communication device begins monitoring the group cell ID instead of the single cell ID.

At event 1308, the network controller 130 sends the position trigger 760 to the first base station (source base station) 706. A suitable technique for transmitting the position trigger includes sending the message over the S1 communication link. In some circumstances, the source base station may obtain the position trigger directly from other sources, such as from other neighboring base stations over the X2 link. The information can be relayed from one base station to another.

At event 1310, the first base station 706 makes a transition decision to transition the mobile wireless communication device from the first base station to the second base station. The transition decision is similar to a conventional handover decision. Accordingly, the transition decision is in response to the position trigger similarly to a handover decision that is in response to a measurement report from a mobile device.

At event 1312, a transition request is sent from the first base station (source) to the second base station (target). The transition request is similar to a conventional handover request. Therefore, the source base station issues the transition request message to the target base station passing necessary information to prepare for the transition at the target side.

At event 1313, the target base station performs admission control.

At event 1314, the second base station returns a transition request acknowledgment to the first base station. The transition request acknowledgment is similar to a conventional handover request acknowledgment. The target base station prepares for the transition with L1/L2 and sends the HANDOVER REQUEST ACKNOWLEDGE to the source base station.

At event 1316, buffered and in-transit packets are delivered to the target base station.

At event 1318, the source base station sends the SN STATUS TRANSFER message to the target base station to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

At event 1320, data is forwarded from the source base station to the target base station.

At event 1322, data packets from the source base station are buffered at the target base station.

At events 1324 and event 826, the target base station exchanges data with the mobile wireless communication device.

Additional messages may be sent in accordance with known techniques to finalize the transition of service from the first base station to the second base station. An example includes transmission of a PATH SWITCH REQUEST message from the target base station to MME in the network controller to inform network controller that the mobile wireless communication device has changed cells. Another example includes a MODIFY BEARER REQUEST message from the MME to the Serving Gateway. The Serving Gateway then switches the downlink data path to the target side. The Serving Gateway sends one or more "end marker" packets on the old path to the source base station and then can release any U-plane/TNL resources towards the source base station.

Figure 14:
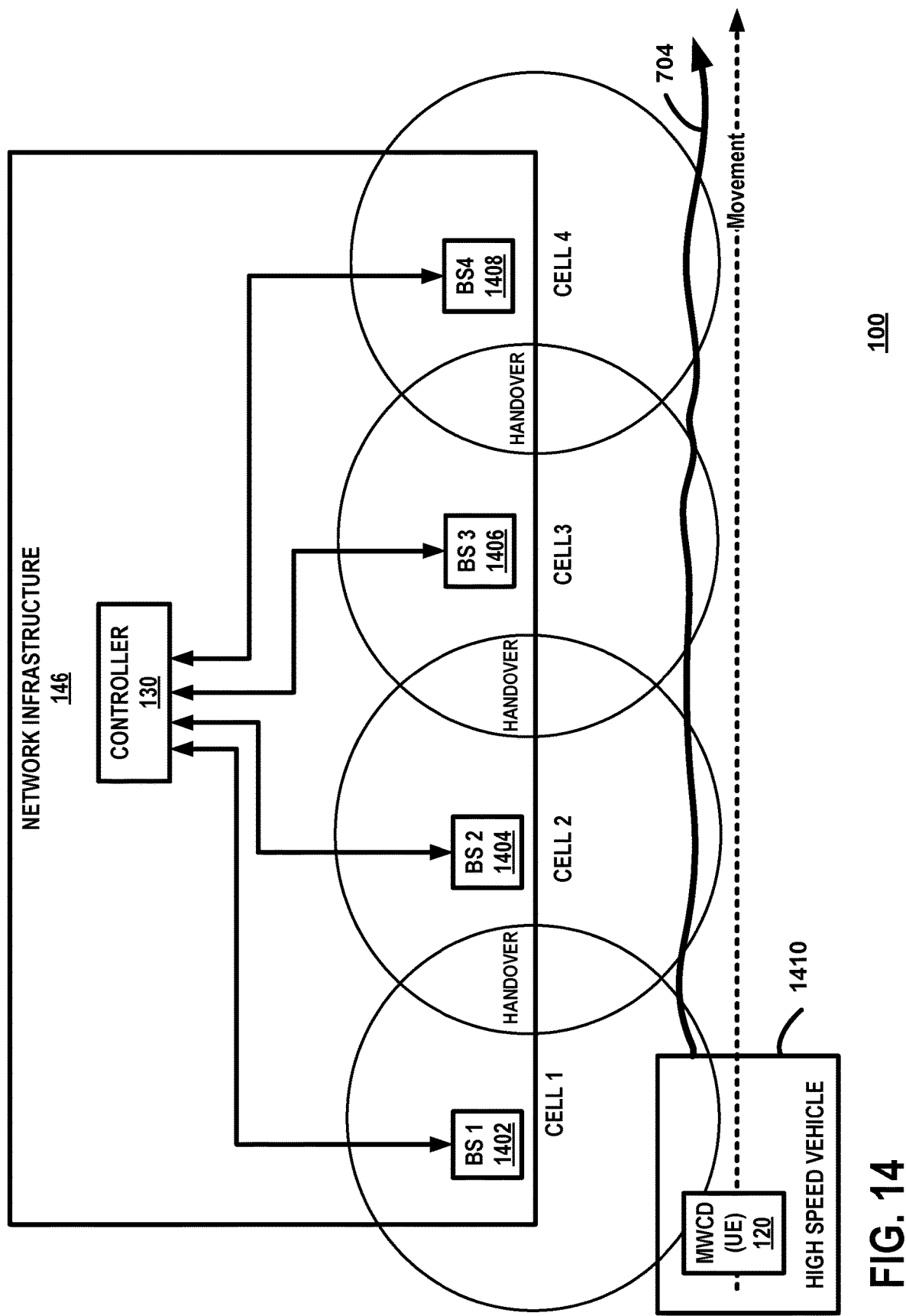
FIG. 14 is a block diagram of a communication system where the mobile wireless communication device travels on a high-speed train.
Figure 15:
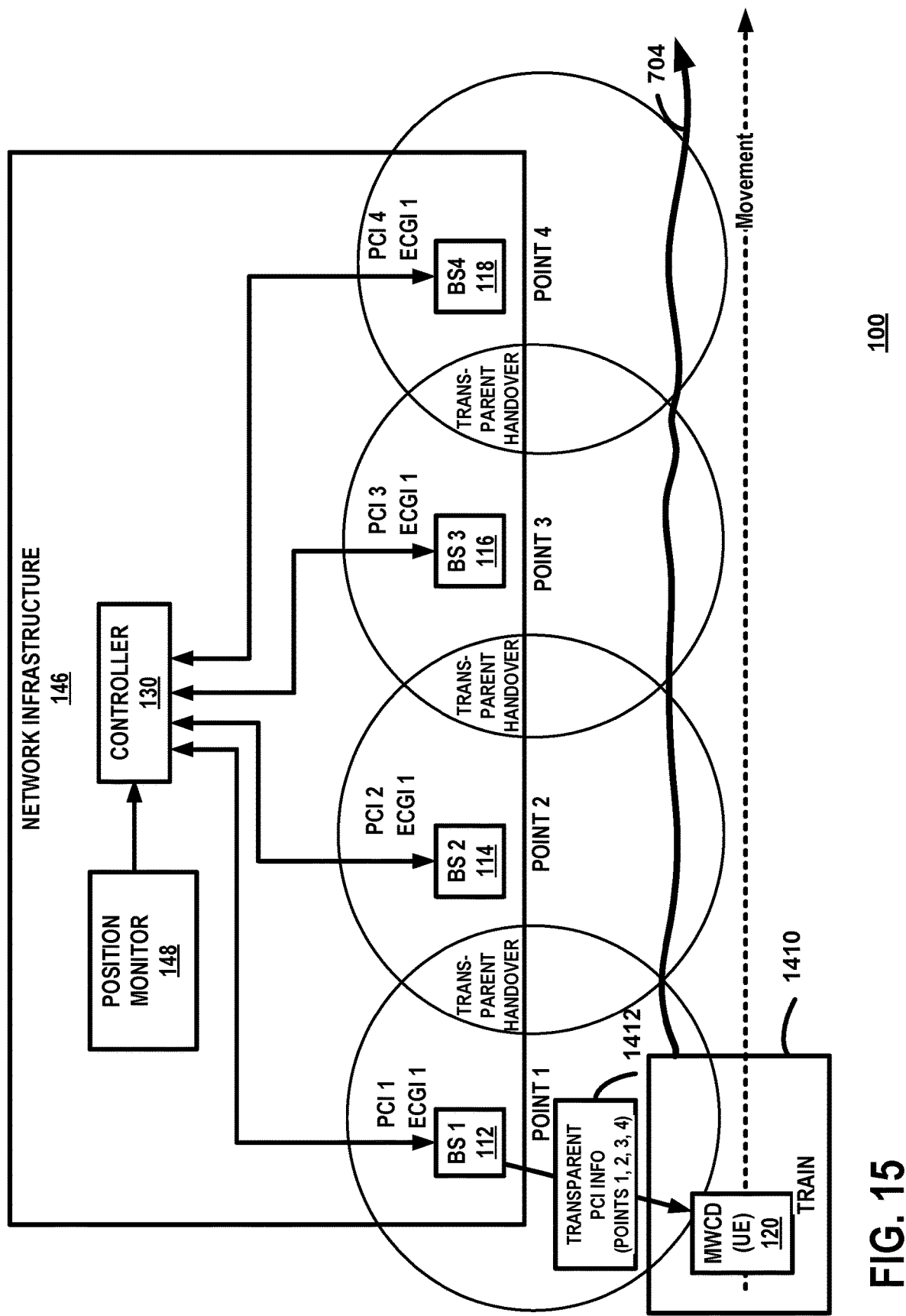
FIG. 15 is a block diagram of the communication system where base stations along the path of the high-speed vehicle have the same EGCI to facilitate transparent handovers.
Figure 16:
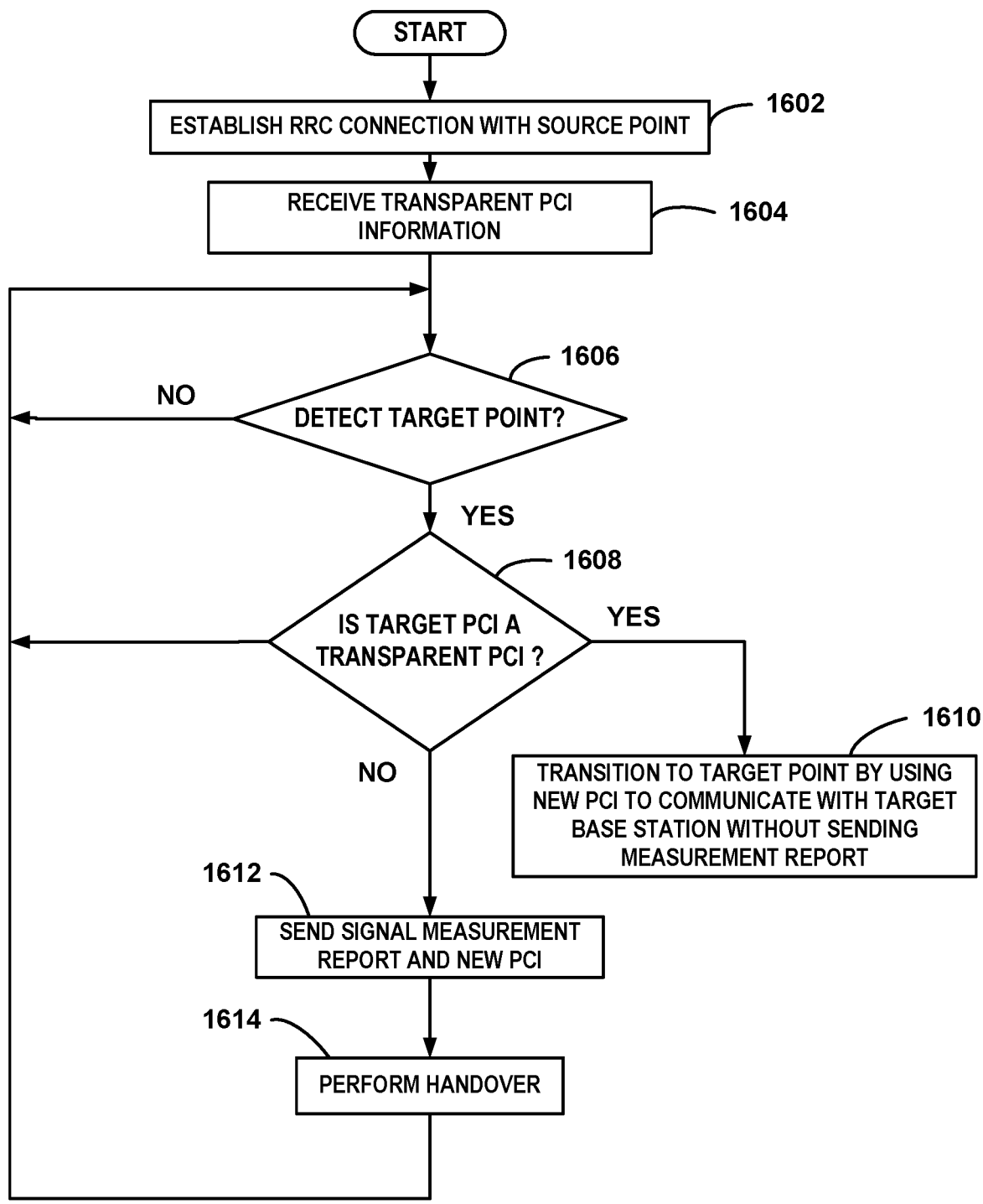
FIG. 16 is a flowchart of a method for performing a transparent handover.

The discussion related to FIG. 14 through FIG. 16 is directed to an example of a transition procedure referred to as a transparent handover procedure where the mobile wireless communication device is not required to report signal measurements or other information prior to a handover.

FIG. 14 is a block diagram of a communication system where the mobile wireless communication device 120 travels on a high-speed train 1410. Base stations 1402, 1404, 1406, 1408 provide wireless communication services in geographical regions depicted by the circles in FIG. 14. An example of a suitable base station structure is provided above with reference to FIG. 7B. For this transparent handover example, each base station has two identifiers to identify its corresponding cell. The two identifiers include:

(1) a base station identity code or physical cell identifier ("PCI") which is typically regionally unique, but not globally unique, and generally broadcast by the base station on its Synchronization Channel ("SCH"). The PCI allows a mobile wireless communication device (UE) to quickly identify the base station; and (2) an evolved cell global identifier ("ECGI") which is globally unique and generally broadcasted by the base station on its Broadcast Channel ("BCH") along with other system information. The system information generally comprises multiple system information blocks, and the ECGI is generally included in a System Information Block 1 ("SIB1").

In a conventional handover procedure, the mobile wireless communication device (UE) only needs to acquire the PCI from the Primary Synchronization Signal (PSS) of the target cell and send the measurement report, including the PCI information, to the source cell. The PSS is transmitted twice every 10 ms and is designed to be easily acquired by the mobile wireless communication device. In contrast, the ECGI, sent in System Information Block 1 or SIB1, is transmitted every 80 ms by a cell, and is not normally needed by the source cell to perform the handover decision. In some cases, the source cell may request the mobile wireless communication device to obtain the ECGI of the target cell if there is a possibility of PCI confusion. PCI confusion may arise when more than one cell uses the same PCI, since there are only 504 PCIs available for use. Thus, mobile wireless communication devices typically do not attempt to acquire the ECGI of a base station. Mobile wireless communication devices conventionally use the PCI transmitted in the Synchronization Channel to determine whether or not there is a cell change once an event trigger exceeds a predetermined threshold.

Each cell in a network is assigned a PCI. Handovers can be triggered based on a triggering event and measurement report associated with the detection of a neighbor cell or target cell having a different PCI. While PCIs are not necessarily unique, adjacent or neighboring cells will conventionally have different PCIs. In a typical handover, a mobile wireless communication device will detect a target base station, which it can differentiate from the base station which it is currently connected to (i.e., the source base station) by its differing PCI.

While still within the coverage area of the source base station, the mobile wireless communication device or mobile relay will measure the signal strength of the target base station. These measurements are then sent by the mobile wireless communication device or mobile relay in a measurement report to the source base station to initialize the handover process. The source cell decides if a handover should occur. In addition, at various times during this handover process, the source base station may request additional information from the mobile wireless communication device.

Prior to sending the measurement report to the source cell, the mobile wireless communication device will perform a signal strength measurement over a period of time (i.e., "time-to-trigger') based on the configured trigger type in order to prevent ping-pong effects, which would occur if the mobile wireless communication device were to be rapidly handed back and forth between the target base station and source base station due to fluctuating signal strengths from one or both base stations. If the signal strength exceeds the threshold, the mobile wireless communication device would send the measurement report to the source cell and the source cell may trigger a handover of the mobile wireless communication device to the target base station.

In an embodiment of the present invention, prior to triggering the handover, the source base station (e.g., cell 1 in FIG. 14) may instruct the mobile wireless communication device 120 to read and report the ECGI of the target base station (e.g., cell 2). According to an embodiment, this instruction to the mobile wireless communication device comprises the newly discovered PCI of the target base station as a parameter. The mobile wireless communication device may then acquire the ECGI of the target base station from SIB1 of the BCH of the target base station and report the target cell's ECGI to the source cell. The source cell will determine whether it is appropriate to proceed with the handover based on the reported parameters.

While conventional systems can perform handovers within a matter of seconds, in a high-speed context like a high-speed train, a matter of seconds may be too long. The present systems and methods eliminate the need for a mobile wireless communication device to participate in handovers between base stations or cells. Whereas according to conventional systems, the mobile wireless communication device must convey measurement data to a source base station (e.g., cell 1) in order for the network 146 to determine whether a handover should occur and/or to perform the handover to a target base station (e.g., cell 2), according to disclosed systems and methods network 146 perform handovers which are transparent to the mobile wireless communication device 120. In other words, the mobile wireless communication device does not need to send measurement data, and may not even know that a handover has occurred. By avoiding the need for the mobile wireless communication device to participate in handovers as it transitions from base station to base station or cell to cell, RLF can be minimized.

In an embodiment, each base station or geographic region can be considered a "point." A point can communicate with mobile wireless communication devices like a traditional base station or macrocell. However, a point is allowed to share the same ECGI as a neighboring point. Thus, the mobile wireless communication device which, in the example, is configured to trigger handovers based on the ECGI, rather than the PCI, or which requires the ECGI of the source base station and target base station to be different in order for a handover to occur, would not trigger handovers between two points sharing the same ECGI. Rather, the mobile wireless communication device would simply consider the two points as the same cell due to identical ECGIs. From the mobile wireless communication device's perspective, the cell is not changing as the mobile wireless communication device moves from point to point.

The PCIs of neighboring points (e.g., cells 1 and 2) may continue to be distinct. In other words, neighboring points along the path 704 of the high-speed vehicle 1410 may have different PCIs, but the same ECGI. Thus, mobile wireless communication devices not onboard the high-speed vehicle 1410 and identified as having a speed greater than the speed threshold would still trigger handovers (e.g., according to conventional handover processes) as they move between the two points, since mobile wireless communication devices conventionally trigger handovers based on PCIs, rather than ECGIs. In this manner, the points can serve both the mobile wireless communication devices 120 on high-speed vehicle as well as the mobile wireless communication devices (e.g., of pedestrians) not onboard the high-speed vehicle, according to conventional means.

FIG. 15 is a block diagram of the communication system 100 where base stations along the path of the high-speed vehicle have the same EGCI to facilitate transparent handovers. Accordingly, the geographic service regions can be referred to as points and "transparent" cells when the mobile wireless communication device 120 is engaged in transparent handovers.

With reference to FIG. 15, in an embodiment, the network infrastructure 146 informs the mobile wireless communication device 120 concerning the PCIs for transparent cells (hereinafter, referred to as transparent PCIs). Transparent PCIs are those which, according to the disclosed embodiments, do not require the mobile wireless communication device 120 to report signal measurements or other information to network prior to a handover. In the example, the list of transparent PCIs 1502 are communicated to the mobile wireless communication devices through dedicated signaling on the Downlink Shared Channel (DL-SCH). Other methods of informing the mobile wireless communication device 120 of the transparent PCIs for cells 1, 2, 3, and 4 include system information transmitted on a common signal channel, e.g., Broadcast Channel (BCH), a message or signal transmitted over the application layer, or any other messaging or signaling means. The message or signal 1502 may be sent or broadcast by one or more of the points (e.g., Point 1 as illustrated in FIG. 2). The mobile wireless communication device 120 may store this list of transparent PCIs in memory. The memory of the mobile wireless communication device 120 may be any internal or external memory device, and may include persistent and/or volatile memories.

As discussed above, in the example, the PCIs for points 1, 2, 3, and 4 are different, but the points 1, 2, 3, and 4 share the same ECGI. If the mobile wireless communication device detects the presence of a target point having a PCI which is in the list of transparent PCIs, the mobile wireless communication device 120 continues to receive and send messages or data without sending any measurement report or attempting to initiate a handover. Since the handover is not initiated, none of the handover signaling of a conventional handover procedure will be needed. In other words, the mobile wireless communication device 120 acts as if it remains within the same cell or point, i.e., the source cell.

FIG. 16 is a flowchart of a method for performing a transparent handover. For the example, the method is performed in a mobile wireless communication device 120 within the communication system 100.

At step 1602, the mobile wireless communication device 120 is connected to a source point having a PCI such as point 1 in FIG. 15. For the example, the connection may be a Radio Resource Control (RRC) connection.

At step 1604, the mobile wireless communication device receives transparent PCI information from the network 146. The information may be transmitted in a signal over a dedicated signaling channel. A suitable technique includes broadcasting a PCI transparent list from the source point. The list is a list of PCIs associated with target points for which the mobile wireless communication device should not initiate a handover. The mobile wireless communication device stores the list of transparent PCIs in memory. The list of transparent PCIs may be subsequently updated if the mobile wireless communication device receives an updated list of transparent PCIs through updated messaging or signaling. Updates may be sent using a SIB broadcast messaging by the serving cell in some circumstances.

Alternatively, instead of sending a list of transparent PCIs, the network 146 may send the mobile wireless communication device a particular rule, set of rules, or algorithm that the mobile wireless communication device is to apply in order to determine whether or not a PCI is associated with a transparent point which should not trigger a handover. For example, the network 146 may inform the mobile wireless communication device that PCIs which comprise consecutive numbers or other identifiers are associated with transparent points which should not trigger a handover of the mobile wireless communication device. As with the list, these rules or algorithms may be stored in a memory of the mobile wireless communication device, and may be updated as needed through further messaging or signaling.

At step 1606, the mobile wireless communication device 120 determines whether a target point is detected. The mobile wireless communication device determines if a point in range of the mobile wireless communication device 120 with a different PCI than the source point is present. If a target point is detected, the method continues to step 1608. Otherwise, the mobile wireless communication device continues to stay connected to the source point and search for a target points.

At step 1608, the mobile wireless communication device 120 determines if the PCI of the target point is a transparent PCI. Where the transparent PCI information is a transparent PCI list, the mobile wireless communication device 120 compares the target PCI to the list and determines that the target PCI is a transparent PCI if there is a match. The comparison may be performed using a list of transparent PCIs stored in a memory or by comparing the PCI of the target point directly to the list of PCIs in a dedicated signal channel of the network 146. Alternatively, the mobile wireless communication device may apply one or more rules or algorithms to the PCI of the target point and/or the PCI of the source point to determine whether the target PCI is associated with a transparent point. If the mobile wireless communication device determines that the target PCI is a transparent PCI, the method continues at step 1610. Otherwise, the method continues at step 1612.

Therefore, if the PCI of the target point is not in the list of transparent PCIs or if the application of the one or more rules or algorithms indicates that the target point is not a transparent point, the method proceeds to step 1612 where a signal measurement report and the target PCI is sent to the network before a handover is performed at step 1614. At step 1612, mobile wireless communication device initiates a handover procedure by sending the measurement report to the source point.

On the other hand, if the PCI of the target point is in the list of transparent PCIs or the mobile wireless communication device otherwise determines that the target PCI is a transparent PCI, the mobile wireless communication device proceeds to step 1610.

At step 1610, mobile wireless communication device transitions to the target point, but does not initiate a handover procedure to the target point. Instead, the network 146 performs the necessary handover procedures to switch mobile wireless communication device from the source point to the target point without the need for a measurement report from the mobile wireless communication device and without any handover signaling with mobile wireless communication device. The mobile wireless communication device used the new target PCI to communicate with the target base station and exchange data. As a result, the mobile wireless communication device transitions from the source base station to the target base station.

Since the mobile wireless communication device is communicating with a different point, a new timing advance is provided by the network. The timing advance is a parameter sent by a point to the mobile wireless communication device that allows the mobile wireless communication device to adjust the timing of its transmissions to the target point in order to compensate for the propagation delay between the mobile wireless communication device and the target point. A point determines the required timing advance based on the difference between the time at which the point receives a transmission and the time that the transmission should be received to be aligned with the point's time slot structure. In general, the timing advance configured to the mobile wireless communication device will be different for each point. When the mobile wireless communication device moves from one point to another, a timing advance suitable for the target point must be provided. Since the geographical position of the mobile wireless communication device, relative to each target point along the path, is known by the network, the timing advance associated with a point may be included in a field in the list of transparent PCIs. Alternatively, the timing advance of the target point may be sent prior to the transition by the source point with an indication that the new timing advance is only applicable to the target point.

At some point, the mobile wireless communication device starts to receive data from the target point using the target PCI. The mobile wireless communication device may continue to use the same cell radio network temporary identifier (C-RNTI) in the target point as was used in the source point, or it may be assigned one associated with each transparent PCI value when it receives the list of transparent PCIs. The time at which the mobile wireless communication device starts to communicate with the target point may be based on its location, which it may obtain, for example, from a GPS receiver. It is also possible that the target point only begins to send downlink transmissions using the target PCI after the target point receives an uplink transmission that uses the target PCI.

In order to perform this transparent handover without relying on a measurement report from the mobile wireless communication device, the network 146 must be able to track the location of the mobile wireless communication device. Otherwise, the network 146 will not be able to select the most suitable point to serve the mobile wireless communication device or even know whether a handover should be initiated in the first place. As explained above, however, a position monitor 148 may used to inform the network 146 of the position of the high-speed train allowing the network 146 to track the position of the train and the mobile wireless communication device. Accordingly, since the path 704 (e.g., speed and heading) of a high-speed vehicle 1410 such as a high-speed train is known, the network 146 can simply track the location of the high-speed vehicle 1410, instead of relying on a feedback mechanism of the mobile wireless communication device to inform the network 146 of the location of the mobile wireless communication device. In some situations, the mobile wireless communication device may continue to provide feedback about its location to the network 140 for tracking purposes.

The location and/or path of the high-speed vehicle 110 may be received by the network 140, for example, through existing monitoring systems which are generally present for high-speed vehicles 110 such as trains and airplanes. In an embodiment, known information about the speed and heading of the high-speed vehicle 110 is received by a scheduler of the controlling unit located either in each cell or point of the network 146 (e.g., the source point) or in a more central location in the network 146 such as the controller 130, for example. The scheduler is typically responsible for allocating the resources of one or more points for the connected mobile wireless communication device. In one example, a centralized scheduler is used to coordinate the resources of multiple points.

The scheduler may use the speed and heading of the high-speed vehicle 1410 to predict where the mobile wireless communication device will be located in the future. The backhaul link between the point and the mobile relay 130 and resource scheduling may be similar to conventional mobile wireless communication device operations (i.e., operations without transparent PCI). A simple scheduler implementation can allocate resources using spatial-beam shifting to direct transmission and/or reception of signals along the path of the high-speed vehicle 110 (and thus the path of the mobile wireless communication device), using the information about the speed or velocity of the high-speed vehicle 1410 received from an external monitoring system such as the position monitor 148. The transmission/reception point for the spatial-beam shifting can be handed over to a target point once it is determined, based on the path of the train, that a handover to the target point should be initiated. The scheduler can use a speed estimate, GPS, track installed triggers, and other methods to determine the location and/or path of the high-speed vehicle 1410.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A mobile user equipment (UE) wireless communication device comprising:
   a receiver configured to:
      receive a first System Information Block (SIB) message from a first base station, the first SIB message including threshold information, the threshold information including a threshold number of cell changes and a threshold time period, and
      receive a second SIB message from a second base station, the second SIB message including an indication that indicates a cell managed by the second base station belongs to a set of cells, the indication common among cells in the set and transmitted by each cell of the set to indicate that each cell belongs to the set; and
   a controller configured to:
      determine whether a number of cell changes completed by the mobile UE wireless communication device during the threshold time period is greater than the threshold number of cell changes, and
      in response to determining that the number of cell changes completed by the mobile UE wireless communication device during the threshold time period is greater than the threshold number of cell changes, invoking a cell selection process where a transition process from the first base station to at least one of the cells of the set of cells is preferred to another transition process from the first base station to other cells not included in the set of cells.

2. The mobile UE wireless communication device of claim 1, wherein the second SIB message is a System Information Block Type 1 (SIB1) message.

3. The mobile UE wireless communication device of claim 1, wherein the indication is a group cell identifier.

4. A mobile user equipment (UE) wireless communication device comprising:
a receiver configured to:
receive a first System Information Block (SIB) message from a first base station, the first SIB message identifying a threshold number of cell changes and a threshold time period, and
receive a second SIB message from a second base station, the second SIB message including an indication that indicates a cell managed by the second base station belongs to a set of cells, the indication common among cells in the set and transmitted by each cell of the set to indicate that each cell belongs to the set; and
a controller configured to invoke a cell selection process where a transition process from the first base station to at least one of the cells of the set of cells is preferred to another transition process from the first base station to other cells not included in the set of cells in response to a determination that a number of cell changes completed by the mobile UE wireless communication device during the threshold time period is greater than the threshold number of cell changes.

5. The mobile UE wireless communication device of claim 4, wherein the second SIB message is a System Information Block Type 1 (SIB1) message.

6. The mobile UE wireless communication device of claim 4, wherein the indication is a group cell identifier.

7. A method comprising:
receiving, at a mobile UE device, a first System Information Block (SIB) message from a first base station, the first SIB message including threshold information, the threshold information including a threshold number of cell changes and a threshold time period;
receiving, at the mobile UE device, a second SIB message from a second base station, the second SIB message including an indication that indicates a cell managed by the second base station belongs to a set of cells, the indication common among cells in the set and transmitted by each cell of the set to indicate that each cell belongs to the set;
determining whether a number of cell changes completed by the mobile UE wireless communication device during the threshold time period is greater than the threshold number of cell change; and
in response to determining that the number of cell changes completed by the mobile UE wireless communication device during the threshold time period is greater than the threshold number of cell changes, invoking a cell selection process where a transition process from the first base station to at least one cell of the set of cells is preferred to another transition process from the first base station to other cells not included in the set of cells.

8. The method of claim 7, wherein the second SIB message is a System Information Block Type 1 (SIB1) message.

9. The method of claim 7, wherein the indication is a group cell identifier.

* * * * *